United States Patent [19]
Zador

[11] Patent Number: 6,125,201
[45] Date of Patent: Sep. 26, 2000

[54] METHOD, APPARATUS AND SYSTEM FOR COMPRESSING DATA

[75] Inventor: Andrew Michael Zador, 80 Charles Best Place, Kitchener, Ontario, Canada, N2M 5A3

[73] Assignee: Andrew Michael Zador, Kitchener, Canada

[21] Appl. No.: 09/147,403
[22] PCT Filed: Jun. 25, 1997
[86] PCT No.: PCT/CA97/00452
  § 371 Date: Dec. 18, 1998
  § 102(e) Date: Dec. 18, 1998
[87] PCT Pub. No.: WO98/11728
  PCT Pub. Date: Mar. 19, 1998
[51] Int. Cl.[7] .................................................. G06K 9/00
[52] U.S. Cl. ............................................ 382/166; 382/248
[58] Field of Search ................................ 382/162, 163, 382/164, 165, 166, 167, 232, 235, 236, 237, 238, 239, 240; 364/526; 358/426, 427, 428, 429, 430, 456, 457, 458

[56] References Cited

U.S. PATENT DOCUMENTS

| | | | |
|---|---|---|---|
| 5,172,237 | 12/1992 | Blonstein et al. | 358/426 |
| 5,731,988 | 3/1998 | Zandi et al. | 364/526 |
| 5,748,786 | 5/1998 | Zandi et al. | 382/240 |
| 5,838,817 | 11/1998 | Funada | 382/166 |
| 5,966,465 | 10/1999 | Keith et al. | 382/232 |

*Primary Examiner*—Bijan Tadayon
*Assistant Examiner*—Amir Alavi
*Attorney, Agent, or Firm*—Gowling Lafleur Henderson LLP

[57] ABSTRACT

An apparatus and method for image data compression performs a modified zero-tree coding on a range of absolute image values from the largest to a determined smaller absolute value, based upon file size or quality. If it is desired to maintain more detail in the image, then a vector quantizer codes the remaining values below this determined smaller value to zero, and lossless entropy coding is performed on the results of the two coding steps. The determined smaller value can be adjusted by examination of the histogram of the tree, or iteratively to meet a preselected compressed image size criterion or to meet a predefined level of image quality, as determined by any suitable metric. If the image to be compressed is in RGB color space, the apparatus converts the RGB image to a less redundant color space before commencing further processing.

32 Claims, 10 Drawing Sheets

METHOD, APPARATUS AND SYSTEM FOR COMPRESSING DATA

FIELD OF THE INVENTION

The present invention relates to a method, apparatus and system for compressing data. More specifically, the present invention relates to the compression of data relating to images and the like.

BACKGROUND OF THE INVENTION

Data compression systems are well known. Essentially, data compression systems operate on an original data stream, or file, and exploit the redundancies in the data and/or remove superfluous data to reduce the size of the data to a compressed format for transmission or storage. When it is desired to use the data, it is decompressed to a form in which it may be used normally. There are essentially two forms of data compression system, namely reversible (lossless) and irreversible (lossy) systems.

Reversible compression systems are used when it is necessary that the original data be recovered exactly, and these systems are generally used for data such as executable program files, database records, etc. Reversible compression systems include Huffman coding, arithmetic coding, delta modulation, and LZW compression. Depending upon the amount of redundancy in the data (the entropy of the data) to be compressed, reversible compression systems can typically provide a compression ratio of about 2 to 1 or 3 to 1 on real-world images, (expressed as 2:1 or 3:1).

Irreversible compression systems are used when it is not required that the original data be recovered exactly and an acceptable approximation of the data can be employed instead. Unlike reversible compression systems, irreversible compression systems can be designed to provide almost any desired compression ratio, depending only upon the standards to which the recovered approximation of the data is subject.

One common use for irreversible compression systems is image compression, as images generally can undergo irreversible compression and decompression with visually acceptable results. For example, digital still images are often processed with the JPEG (Joint Photographic Experts Group) compression system for storage and/or transmission. The JPEG algorithm is described in many references, including, "JPEG Still Image Data Compression Standard", Van Nostrand Reinhold Publishers, William Pennebaker, Joan L. Mitchell, the contents of which are incorporated herein by reference. Depending upon the intended use for the recovered image, JPEG systems can be set to various desired compression ratios, generally between 2:1 and 40:1, although it should be noted that undesired artifacts of JPEG compression (blocking, moire patterning, "denting & bruising", color quantization etc.) tend to dominate smaller images compressed past 12:1 when using a standard JPEG compression system.

Video images can also be compressed with irreversible compression systems, and the MPEG (Moving Pictures Expert Group) and MPEG-II and MPEG-III compression standards have been proposed as reasonable systems for use in such applications. However, typical undesired artifacts of compression for MPEG include all of the JPEG artifacts plus "glittering" at moving edges and color pulsing. The glittering artifacts are due to pixels with values which are far from a block's mean, shifting the average luminance and/or chrominance of a block from frame to frame as these outlying-valued pixels migrate from block to block due to motion of objects in the scene or motion/zooming of the camera. Also, quantization of the lowest frequency terms in the transform quantize the color gamut irreversibly, so that any subsequent insertion or editing will add to future generations of picture distortion.

Irreversible compression systems trade increased compression ratios for decreased quality of the recovered image i.e.—higher compression ratio, poorer approximation of the data. Unfortunately, at the higher compression ratios requested or required by video providers, the Internet, POTS line users (Plain Old Telephone Service lines) and others, all of the prior art irreversible compression systems known to the present inventor result in recovered images of unacceptable visual quality when required to transmit or store larger images in reasonable bandwidth. A necessary byproduct of irreversible compression is distortion in any statistical sense, but careful choice of processes and filtering criteria can delay the onset of visible degradation well into the "low-statistical-quality" range for PSNR. Similarly, careful attention to minimizing file size using PSNR as the sole criterion can lead to a very high PSNR while the image looks washed out in low visual activity areas such as textures or light patterns.

For example, still 256×256 pixel monochrome 8 bit images compressed at a ratio of more than 12:1 with JPEG systems generally exhibit an unacceptable blockiness, which is an artifact of the discrete cosine transform (DCT) block processing stage of the JPEG system. Similar images compressed by a JPEG system to similar ratios present unacceptable "banding" effects and Gibbs phenomena near high contrast boundaries.

Generally, the visible degradations of a recovered image are referred to as compression artifacts and attention has been directed to developing irreversible compression systems whose artifacts are unnoticeable or at least less noticeable to the human visual system at more useful compression ratios, and to developing reversible compression systems with lower entropy resulting from better analytic procedures, more attuned to the Human Visual System (HVS).

SUMMARY OF THE INVENTION

It is an object of the present invention to provide a novel data compression method, apparatus and system which obviates or mitigates some of the disadvantages of prior art.

According to a first aspect of the present invention, there is provided a method of compressing a digital image to obtain a compressed image data set for subsequent reconstruction, comprising the steps of:

(i) determining if the digital image is a color image in RGB color space and converting any determined RGB color images to a less redundant color space;

(ii) performing a wavelet decomposition upon each of the color planes of the image in said less redundant color space to obtain a transform of DC and non-DC terms for each color plane;

(iii) lossless delta coding of the DC terms;

(iv) converting the transform to sign and magnitude format and selecting a division point comprising an adjacent pair of bit-planes (or adjacent pair of magnitudes), which separate the non-DC terms (i.e.—the differential or AC terms) into first and second ranges based upon absolute magnitudes, the first range comprising the values of the transform which are greater in magnitude than those values in the second range of the transform;

(v) employing a scalar quantizer to encode the values in the first range;

(vi) employing a vector quantizer to encode the values in the second range; and (vii) coding the resulting data set with a lossless entropy coder to obtain a compressed image data set.

Preferably, the method also allows error detection and correction codes to be applied in the lossless coding of DC terms, modified zero-tree and/or vector quantizers, as desired, based upon importance of the coded information to the final reconstructed quality, and compression requirements. The method will permit the coding of the most visually significant data into the smallest (and soonest sent) blocks, thus permitting less rigorous error control on the last (and statistically largest) blocks which carry little visual data, and progressively less error control on each successive (larger, visually less significant) block. Also preferably, the lossless entropy coding is LZW, LZ77, Arithmetic, Simultaneous Multi-Model-Driven Arithmetic, Huffman, or any other suitable lossless coding technique as will occur to those of skill in the art. Also preferably, the method further comprises the step, before defining the division point, of depleting data in the transform, using visual sensitivity rules, by removing or more severely quantizing elements which would be invisible due to masking by other information in the image. For example, dark regions of an otherwise bright image, mask the subtle changes in low luminance in those regions, so that only visible changes need be transmitted.

According to another aspect of the present invention, there is provided an apparatus for compressing a digital image to obtain a compressed image data set for subsequent reconstruction, comprising:

means to detect and convert digital image data from RGB color space to a less redundant color space;

means to perform a wavelet decomposition of each color plane of said image in said less redundant color space to obtain a transform of DC and non-DC terms;

means to losslessly encode said DC terms;

means to convert said transform to a sign and magnitude format and to select, or permit to be selected, a division point comprising a pair of adjacent bit planes or adjacent magnitudes which separate the non-DC terms into first and second ranges, based upon absolute magnitudes, the first range comprising values of the transform which are greater in magnitude than those in the second range of the transform;

scalar quantizer means to encode the values in said first range;

vector quantizer means to encode the values in said second range; and means to losslessly encode the resulting data set to obtain a compressed image data set.

According to yet another aspect of the present invention, there is provided an article of manufacture comprising a computer usable medium having computer readable program code means embodied therein for implementing a digital image compression apparatus, the computer readable program code means in said article of manufacture comprising:

computer readable program code for causing said computer to detect and convert digital image data from RGB color space to a less redundant color space;

computer readable program code means for causing said computer to perform a suitable wavelet decomposition of each color plane of said image in said less redundant color space to obtain a transform of DC and non-DC terms;

computer readable program code means for causing said computer to losslessly encode said DC terms;

computer readable program means for causing said computer to convert said transform to a sign and magnitude format and to select a division point comprising a pair of adjacent bit planes or adjacent magnitude values which separate the non-DC terms into first and second ranges, based upon absolute magnitudes, the first range comprising values of the transform which are greater in magnitude than those in the second range of the transform;

computer readable program code means for causing said computer to perform a scalar quantization to encode the values in said first range;

computer readable program code means for causing said computer to perform a vector quantization to encode the values in said second range; and computer readable program code means for causing said computer to losslessly encode the resulting data set to obtain a compressed image data set.

According to yet another aspect of the present invention, there is provided a method of encoding wavelet transformed digital information composed of DC and non-DC terms, comprising the steps of:

(i) establishing a hierarchy in said transformed digital information wherein each pixel in each of three orientation blocks in the highest level adjacent the DC terms is identified as the parent of a corresponding two by two array of child pixels in the corresponding block in the next lower level and repeating said identification for each lower level;

(ii) for the highest level to the lowest level of the hierarchy to be encoded, examining each trio of corresponding horizontal, vertical and diagonal pixels in the level in turn in a dominant pass to identify pixels not previously deemed significant and losslessly encoding the address and sign of said identified significant pixels in the present level and examining the trio of two by two child arrays of pixels in each lower level down to the lowest level, and identifying those newly significant pixels, wherein addresses may be encoded implicitly by fully raster-scanning the highest AC blocks surrounding the DC image, subsequent addresses down each significant tree are implied by the embedded symbols used to code subsequent significance in each tree;

(iii) identifying zero-tree roots in pixels of said trees, and removing from those trees, the insignificant pixels which are dependent from such a zero tree roots;

(iv) in a subordinate pass, outputting the magnitudes of all significant pixels identified in the dominant pass, in the same order as the dominant pass was performed, said output magnitudes having a preselected numeric precision based upon a visual perception rule set; and (v) either: repeating steps (ii) through (iv) for each level until the lowest level has been processed, in a similar manner to Shapiro's EZW code; or, in a preferred embodiment of the zero-tree, setting a threshold and visual sensitivity, level by level (or block by block for finer control), based upon visual perception rules, one coding pass (dominant, then subordinate) is performed. In the latter case, the threshold is the lowest absolute amplitude coefficient to include in the zero-tree data set in a given block or hierarchy. The zero-tree algorithm codes as significant all pixels at least as large as the present block's threshold, and sends sufficient bits of accuracy to reflect that block's visual contribution based upon human visual sensitivity by scale, color plane, orientation, masking luminance and masking noise. The iterative bit plane search and sort by magnitude taught by Shapiro is not performed. This new method speeds up the zero-tree process, and shrinks the entropy of the information to be sent before the quality is depleted. It eliminates the address data required by Shapiro which would otherwise need to be transmitted (By contrast, see the state machine method for eliminating address data by Said and Pearlman: "Image Compression Using the Spatial-Orientation Tree", 1993 IEEE Inter-national Symposium on Circuits and Systems, Volume 1, pp 279–282, 1993, Amir Said, William A. Pearlman). By requiring the highest AC blocks (which are fairly small) to be fully rasterized and transmitted with code symbols regardless of amplitude, all trees of data in the zero-tree have a master ancestor present to attach to by the tree of symbols embedded. Further, the DC block pixels can each hold a flag to indicate if none of the three AC trees of data representing that pixel is significant in the zero-tree. The zero-tree can be thought of as a fancy scalar quantizer. Once the zero-tree entropy budget has been exhausted, (the low population—high amplitude signals have been optimally transmitted), we are left with a large population of low entropy pixels which carry the pattern, texture, and noise information. The noise may be image noise (a human arm may have freckles), which should not be discarded, or it may be scanner noise, focus error, astigmatism, a dirty print, etc.

A four-dimensional vector quantizer can function underneath the zero-tree with the following major advantages:

1) Any vector quantizer is better at encoding low entropy, large quantity information compactly than any scalar quantizer, and we are only assigning the lowest bits below the threshold to our vector quantizer, instead of the 8 or 10 bit data for the entire transform which would pollute the transform histogram with large numbers of high energy vectors with low individual populations, which the vector quantizer would find difficult to compress.

2) Using a vector quantizer one can pick the highest energy vectors assigned to the vector quantizer first to transmit the biggest contributions early for texture, pattern, and possibly noise if desired.

3) If one is using a lattice or nearest neighbor quantizer, then one can trade quality for size or vice versa, since all of the visual distortion lies in the vector space. The zero-tree carries sufficient data by block to keep visual error out in its range, thereby simplifying the quality/data-size calculation.

4) Using classical vector quantizers, a codebook is generated, which usually consumes space, and then a raster of image pointers to the codebook is created, for every vector in the image, which takes up more space, including all the really low energy vectors, most of which are true noise and might be discarded except that classical vector quantizer transmits even zero vectors, since it employs a raster scan of pointers. Alternately, if one could avoid sending a raster of pointers, the zero vectors could be discarded completely, and noise could be statistically analyzed and substituted algorithmically at the receiver if required. We already have an optimal structure to avoid sending a complete raster. Therefore we will be adding some symbols to the zero-tree structure signifying with one symbol that the next block of 2×2 children down contains a vector pointer which is significant, so we can send relevant, spatially sparse vectors to the receiver, symbols embedded in the zero-tree, and we can stop at a particular entropy, only transmitting the most significant ones.

5) If a lattice is used then there are ways to eliminate the codebook, thereby reducing image entropy. Another advantage is that if one does not use a codebook then one cannot scramble the image by losing or corrupting the codebook during transmission. (An error in the codebook spreads to all vectors sharing that codebook pointer, not just one vector in the image.) While a lattice vector quantizer is fast, it causes dents in images because objects near the center of a coarse Voronoi region round randomly based upon their truncated values. The non-optimality of a sparse lattice could be eliminated by running a nearest neighbor coder on the bit planes dedicated to the vector quantizer, so that clusters gravitate appropriately in image space. Then we can apply the coarse lattice vector quantizer to the newly gravitated data, avoiding the lattice distortion and the need for a codebook.

This improved combination zero-tree plus dual vector quantizer with zero-tree-embedded vector symbols can optimally address the two different data sets required to transmit high quality video, medical, security and still images.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
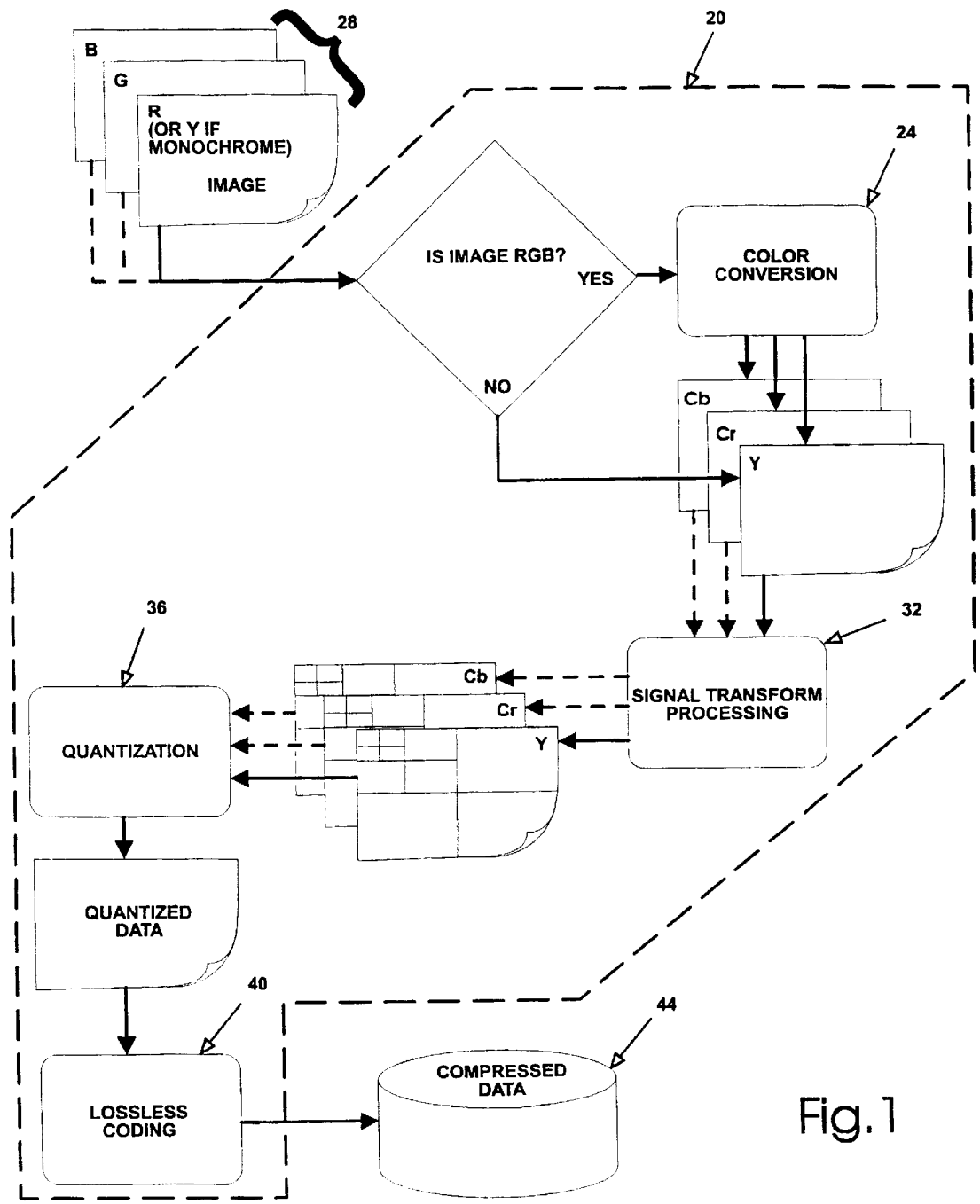
FIG. 1 shows a block diagram of a data compression system in accordance with the present invention.

An irreversible image compression system in accordance with the present invention is indicated generally at 20 in FIG. 1. Image compression system 20 comprises a four stage process: a color conversion stage 24 (if the image 28 is not monochrome) to permit further operations in a less redundant color space; a signal transform processing stage 32 which converts the image to a different domain wherein its redundancies may be more easily exploited; a quantization stage 36 wherein the redundancies are mapped to a reduced set of data; and a lossless coding stage 40 wherein the reduced set of data is compacted and a compressed data output 44 which is created for storage and/or transmission.

In the present invention, it is preferred that a color image to be compressed is first transformed in color conversion stage 24 from RGB color space to Y-Cr-Cb (Luminance and orthogonal Cr, Cb Chrominance) color space using 16 bit precision arithmetic (or up to 32 or 64 bit arithmetic for medical and technical applications). While compression can be performed on an image in RGB color space, this color space is severely redundant and non-orthogonal. In a preferred embodiment of the present invention, the Y-Cr-Cb color space is employed as it is less redundant than RGB color space and is closer to the Hue-Saturation-Brightness (HSB) color space which the human visual perception system employs. This allows a unique color space for the image to be represented with fewer bits of information than does RGB color space. As an example, 5 bits of luminance (Y) plane and three bits each of each chrominance plane (Cr and Cb) may be sufficient to represent an image in Y-Cr-Cb color space with similar color resolution to that which 8 bits each of red, green and blue planes in RGB color space would provide.

For example, if a wall is painted with a pure pigment of arbitrary color and is lighted non-uniformly with a single type of light source, then every pixel in an image of the wall in RGB color space will have a different red, green and blue values as the luminance changes. In fact, an image in RGB color space of a wall painted in shades from black through all shades of gray to white, and thus having no "color" component at all, will still have each red, green and blue value changing for each pixel. However, if the image of the wall is in HSB color space, the hue and saturation values of every point will be identical, and only the brightness values will change due to illumination. While less intuitive, a similar result occurs in Y-Cr-Cb color space. Accordingly, when the derivative of each color space is taken, only the luminance plane is left with relatively high amplitude data, thus allowing better compression to be achieved.

As will be apparent to those of skill in the art, NTSC color space (YIQ) or PAL/SECAM color space (YUV) can be employed instead of Y-Cr-Cb, albeit with slightly increased redundancy relative to Y-Cr-Cb color space, leading to slightly less satisfactory compression results. In the present invention, monochrome images are dealt with directly as the luminance (Y) color plane.

The present inventor has determined that, in a preferred embodiment for commercial/consumer imaging applications, a resolution of 16 bits for coefficients in color conversion stage 24 and 12 bits per image color plane in signal processing stage 32, discussed below, is sufficient for perfect 8 bit per color plane RGB reconstruction on image data 28. As used herein, perfect 8 bit color means that reconstruction yields the original 8 bits of color information, i.e.—any error is less than the integer portion and will not result in incorrect rounding. Further, as one of the steps in color conversion stage 24, a record is created containing the following color space statistics: mean, maximum, and minimum in each orthogonal plane (Y, Cr and Cb) of image space, to allow the reconstruction to be calibrated. When compressed data 44 is to be reconstructed to an acceptable approximation of data image 28, the average color and brightness of the reconstructed image can be re-matched (in Y-Cr-Cb color space) to those of the uncompressed data image 28 by histogram shifts and the extremes of color and brightness can be matched by stretching the histograms on each side of the centroid to the recorded extremum, as will be understood by those of skill in the art.

The present inventor believes that this calibration by re-matching of image color space statistics is particularly useful when motion video images are being compressed and reconstructed.

In particular, frame to frame changes in quantization (which lead to flicker in luminance and chrominance) can be reduced or avoided as the luminance is isolated from the chrominance, average and extremes of luminance are re-matched, and color drift is limited to nearby hues.

Suitable techniques for accomplishing color conversion stage 24 are well known and include a CCIR standard matrix amongst others. The transformation currently preferred by the present inventor comprises a standard transform matrix for the RGB to Y-Cr-Cb conversion and a high precision inversion matrix for the Y-Cr-Cb to RGB conversion.

Specifically, the presently preferred RGB to Y-Cr-Cb transform is:

$$Y=\text{round}\{(0.299\times R)+(0.587\times G)+(0.114\times B)\}$$

$$Cr=\text{round}\{(0.500\times R)-(0.419\times G)-(0.081\times B)+128\}$$

$$Cb=\text{round}\{(-0.169\times R)-(0.331\times G)+(0.500\times B)+128\}$$

and the preferred reverse transform is:

$$R=\text{round}\{Y+(1.40168676\times(Cr-128))-(0.00092674\times(Cb-128))\}$$

$$G=\text{round}\{Y-(0.71416904\times(Cr-128))-(0.34369538\times(Cb-128))\}$$

$$B=\text{round}\{Y+(0.00099022\times(Cr-128))+(1.77216042\times(Cb-128))\}$$

with the range of each color plane limited to stay within reasonable integer values (i.e.—0–255).

The present inventor has determined that this combination of transform matrices allows 8-bit integer perfect reconstruction of color space conversions, provided that no quantization process is performed before the entropy coder. As will be apparent to those of skill in the art, the Y-Cr-Cb to RGB transform presented above employs extended precision values, thus requiring more memory and processing time than some prior art 8 bit transforms. However, the present inventor has determined that this transform is faster than "smart" methods of controlling color space transformation, such as the method disclosed in U.S. Pat. No. 5,416,614, included herein by reference, which can otherwise be employed to reduce memory requirements. Notwithstanding the above, it will be apparent to those of skill in the art that, such known "smart" methods or other equivalent methods can be employed in the present invention, for example in circumstances wherein memory costs outweigh advantages in processing speed.

In system 20, after image 28 has been converted to an appropriate color space (if required), signal processing stage 32 then transforms the image data from the original image space to a desired transform space with an appropriate wavelet filter transform. The present inventor has based the selection of a suitable filter upon the following criteria:

i) Required reconstruction properties, i.e.—perfect or near-perfect;

ii) Orthogonality, or bi-orthogonality property;

iii) The degree of symmetry in the phase (greater symmetry results in less quantization noise, less phase error in quantized edges);

iv) Low side-lobe height (low side-lobe height results in a reduced stop-band noise contribution and improves S/N ratio);

v) The length of the filter (the longer the filter, the greater the calculation time but the smoother the resulting data);

vi) Data compaction characteristics (related to length, number of vanishing moments, and coefficient values. How much energy is in non-zero pixels due to an object's edge of a given height in the picture? Longer filters result in more non-zero terms);

vii) Dimensions, (two 1D wavelets vs one 2D "quincunx or hexagonal wavelet", the need for a 2:1 sub-sampling pyramid for zero-trees requires two 1D wavelets); and viii) Single-pass or double-pass in each direction, of wavelet filters. (Second wavelet pass in large subbands of pyramid reduces entropy, at the cost of more processing.)

In currently preferred embodiments of the present invention, signal processing stage 32 employs either: a Perfect Reconstruction—Quadrature Mirror Filter (PR-QMF) with Near-Linear Phase; or a Symmetric Near Perfect Reconstruction—Quadrature Mirror Filter (Near-PR-QMF) with Linear Phase, or a bi-orthogonal Wavelet Transform (which is a PR-QMF using two different length symmetric filters for low-pass and high-pass). In other embodiments of the present invention, where reduced processing is important (i.e.—in processor-bound systems), it is contemplated that the very short Haar transform can also be used to advantage.

Actual configurations of suitable filters are described in: "Symmetry for Compactly Supported Wavelet Bases", in "Ten Lectures on Wavelets", SIAM, 1992, Ch. 8, pp.251 and pp.287, Ingrid Daubechies; "Numerical Recipes in C—The Art of Scientific Computing 2nd ed.", Cambridge University Press W. H. Press, S. A. Teukolsky, W. T. Vetterling, B. P. Flannery, pp. 591–606; "Wavelet Theory and its Applications", Kluwer Academic Publishers, Randy K. Young; "Wavelets and Their Applications", Jones and Bartlett, Mary Beth Ruskai, Editor; and "Image Coding Using Wavelet Transform", IEEE Transactions on Image Processing, Volume 1, No. 2, April 1992, pp. 205–220, Antonini, Barlaud, Mathieu and Daubechies, the contents of each of which are incorporated herein by reference.

As mentioned above, the selection of a suitable filter is based upon whether or not perfect reconstruction is important, how much quantization will be performed, worst case signal to noise ratio, computational complexity, etc. As these criteria can vary by application, it is contemplated that a user-input or application-specific switch can be provided in system 20 to select a particular filter set for a given application from a list of available filter sets.

A somewhat simplistic description of the application of wavelet filtering is given below, with reference to Appendix A. In image compression systems, the image is assumed to be a non-sparse matrix of image data I, filtered (convolved) by a wavelet which is a sparse diagonal matrix W of digital filter terms L and H (the low and high-pass filter coefficients), repeating, but offset on each successive line in a pattern determined by the type of filter. Thus, the discrete process can be thought of as a matrix multiplication operation of a square, sparse diagonal matrix W on one column of the image "matrix" I at a time. The matrix W has dimensions the same as the column height. The rows and columns of the resulting intermediate matrix T' are exchanged and a square, sparse matrix W' with dimensions of the new column height operates on each of the columns of T'.

The rows and columns of the resulting matrix are then exchanged again and the result is a lower energy transform matrix T. The operation itself may not strictly speaking be a matrix multiplication, but this is the general procedure. It should be noted that, for certain wavelet structures (such as bi-orthogonal wavelets), a substantially more complex process than pure matrix multiplication takes place, and algorithms in the references listed above describe the generation and operation of these wavelet filters. In the matrix notation shown in Appendix A, the first index is the row index with the lowest index value for the top row, and the second index is the column index with the leftmost column having the lowest value.

An example of the operation of a wavelet filter is given below, wherein the Daubechies discrete four element D4 wavelet is employed. The resulting transform matrix T for a row-pass of the image is accomplished by multiplying each row in the image by the filter matrix. The wavelet matrix is always square. As will be apparent, there are as many elements (including all the zero elements) in each axis of the filter matrix as there are pixel values in the image row. (For the column pass, the wavelet matrix would be as wide and tall as the image column is tall.) Each successive row in the top half of the wavelet matrix (the low-pass filter half) is identical to the row above but barrel-shifted by two elements to the right.

The bottom half of the wavelet matrix is similar to the top half, starting at the leftmost matrix position, but the elements are now the high-pass filter coefficients. Thus there are only half as many low-pass (or high-pass) pixels in a row of the transform matrix T as in the original image. This results in a decimation by two of each row. At the end of the low-pass (and high-pass) the non-zero elements of the wavelet in this example wrap around the matrix. In a symmetric filter the wrap-around occurs at each end of the low or high-pass. Other methods of terminating a wavelet to minimize edge distortion during quantization are discussed further on.

As will be apparent, the image need not be square, but the number of pixels in each axis of the image must be an integer multiple of 2 to the power of the number of wavelet hierarchies (levels) in the transform, with the multiplier integer at least as large as the maximum span of non-zero elements in the particular wavelet being used. Using the four element Daubechies D4 filter matrix and an N by N image as an example, a transform pixel will be the result of the following operation:

$$T[u,v]=W[v,1]\times I[u,1]+W[v,2]\times I[u,2]+W[v,3]\times I[u,3]+ \ldots +W[v,N]\times I[u,N]$$

where most of the W×I products will be zero, so that for transform pixel T[2,4]:

$$T[2,4]=W[4,1]\times I[2,1]+W[4,2]\times I[2,2]+ \ldots +W[4,N-1]\times I[2,N-1]+W[4,N]\times I[2,N]=W[4,3]\times I[2,3]+W[4,4]\times I[2, 4]+W[4,5]\times I[2,5]+W[4,6]\times I[2,6]$$

Once the column pass is also performed, the low-pass "DC" image is in the upper left quadrant of the resulting matrix T. The elements which can be seen to wrap around in the filter matrix W multiply pixels at the other end of the image row. This is generally referred to as periodic extension of the image and it results in undesired high-valued pixels in the transform due to dissimilar opposite image borders.

To prevent border artifacts due to simple truncation of the filtering operations, various techniques have been developed including the above-mentioned wrap-around on the image at its edges (i.e.—periodic extension), continuation of the edge pixel values for half of the filter width times 2 to the number of levels, (i.e.—padding), or mirroring of the edge pixel values for a set number of pixels (i.e.—symmetric extension). As will be apparent to those of skill in the art, the success of the particular technique employed depends to some extent upon the type of wavelet used.

In general, the problem with periodic extension is that it leads to a high wavelet domain value at the image edge since the left (or top) edge of the image is not likely to match the right (or bottom) edge, and thus the derivative will be a large pulse at image edges. This pulse cannot be disposed of as it is not an error, but is instead a result of the reversible (potentially perfect) filter process. Unfortunately, if good image quality at picture edges is sought, such pulses (high pixel values) cannot be ignored, and therefore an increase in the entropy of the image data occurs, which is greatly undesired as it makes it difficult to obtain high compression rates for the image data.

Both padding and symmetric extension suffer from slightly less amplified border pixel values, but if the gradient at the picture edge is steep, then a sudden inversion (symmetric extension) will still give a border pulse. Padding will often result in a similar, but smaller pulse.

While any of the above-mentioned techniques for mitigating border artifacts may be employed with the present invention, the present inventor has developed the following technique which is currently preferred. Specifically, the borders of the current image are to be extended on all four sides by a fixed pixel-width "frame" which is sufficiently large such that, for the final wavelet pass in either axis, the number of padding pixels added to each image dimension is at least as long as the wavelet being used. The pixels in this border band are given values varying smoothly from the value of the original image edge pixel to a value equivalent to the midpoint of the color plane. At the original image edge the gradient is matched, if possible, and smoothly leveled off to 0 gradient at the new image edge with the 50% value. Corner pixels would have a 90 degree arc of smoothed gradient to 50%, or in an alternative, the gradient in the border is smoothed in both directions. On this resulting larger framed image, the above-mentioned periodic extension technique can then be employed with no large pulses at the edge, and with no loss of information at the original edge.

The minimum frame width is dictated by the requirement that the last wavelet level will still have to act on a smoothly varying blend between opposite edges. It will be apparent to those of skill in the art however, that this requirement can be relaxed somewhat as, for sufficient numbers of wavelet levels, the number of potentially high-valued transform edge pixels in the last level will be small. As will also be apparent to those of skill in the art, in data compression systems which employ standard scalar or vector quantization, the addition of a "fat" border of extra data would inflate the transmitted data stream. However, as is described below in more detail, the present invention employs a zero-tree type of quantization for the relatively few, high-valued transform elements which represent edge information (of all edges of objects in the picture), and a vector quantizer for the relatively numerous, low-valued transform elements which represent texture and pattern information. Thus, as almost none of the added border data is high amplitude in the transform domain, it would mostly disappear from the zero-tree quantizer and, as there is little underlying texture in this new (smooth) border data, most of it would not need to be processed by the vector quantizer applied to the low bit planes either. It is contemplated that, with the technique disclosed herein, far less high-valued data would be added to the transmitted stream than with conventional treatments.

Other solutions to treat the wavelet filter coefficients near picture borders are also known, such as the method taught in "Border Recovery for Subband Processing of Finite-Length Signals. Application to Time-Varying Filter Banks"; ICASSP 1994, Volume III, pp 133–136, Francois Deprez, Olivier Rioul, Pierre Duhamel, the contents of which are incorporated herein by reference. The modification of the filter coefficients to reduce their output is commonly referred to as apodization. However, most filter apodization methods dispose of some edge data or involve significant quantities of additional processing.

Some of the other known techniques for treating image edges are discussed in: "Truncation of Wavelet Matrices: Edge Effects and the Reduction of Topological Control", December 1992 Preprint, Personal Communication, Michael H. Freedman, William H. Press[7]; "Eliminating Distortion in the Beylkin-Coifman-Rokhlin Transform", ICASSP 1993, Volume III, pp 324–327, John R. O'Hair, Bruce W. Suter; and "Subband Processing of Finite Length Signals Without Border Distortions", ICASSP 1992, Volume IV, pp 613–616, Ricardo L. de Queiroz, the contents of each of which are incorporated herein by reference.

As mentioned above, in a presently preferred embodiment of the invention, one dimensional wavelet filters are employed successively in each of two directions (horizontal and vertical) on the image data, using 2:1 sub-sampling in each axis. Thus the resultant image transform is composed of four quadrants, but remains the same size in terms of pixels. An example of constructing such a three level image transform is shown schematically in FIGS. 2a through 2c. In this discussion, the first letter of a quadrant identifier represents the type of filter operation in the horizontal direction (i.e.—L represents low-pass and H represent high-pass), the second letter represents the type of filter operation in the vertical direction and the number represents the scale (hierarchy) of the filtering.

Figure 2A:
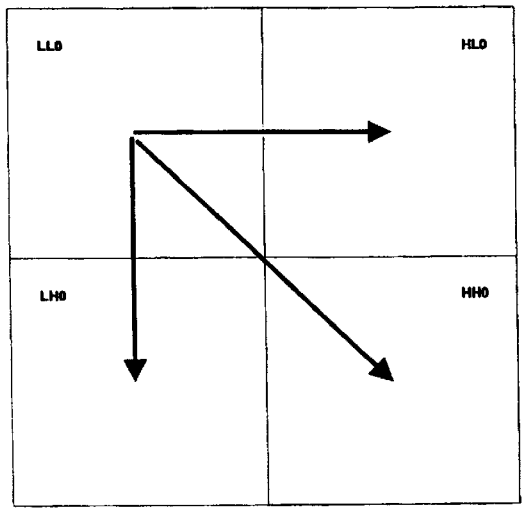
FIGS. 2a through 2c show schematic representations of the stages of constructing a three-level pyramidal convolution of an image.

FIG. 2a schematically shows the results of the first level of transform, wherein: the upper-left block (LL0) is the result of both horizontal and vertical low-pass filtering followed by decimation by 2 in both orientations, and thus represents the DC terms: the upper-right block (HL0) is the result of high-pass horizontal filtering and low-pass vertical filtering followed by decimation by 2: the lower-left block (LH0) is the result of low-pass horizontal filtering and high-pass vertical filtering followed by decimation by 2: and the lower-right block is the result of high-pass filtering in both directions, again followed by decimation by 2 in both orientations. The resulting DC image in block LL0 appears similar to the original image, but is reduced in size in both directions by exactly 50% due to the decimations.

Figure 2B:
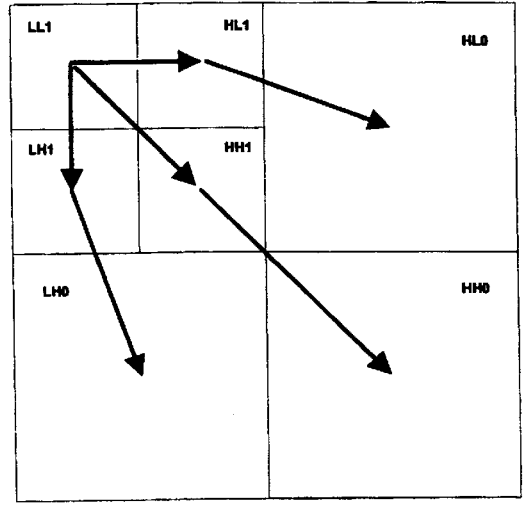

FIG. 2b schematically shows the second level of transform, wherein blocks HL0, LH0, and HH0 are as before, and wherein block LL0 has been further transformed into: LL1, which is the new DC term resulting from vertical and horizontal low-pass filtering and decimation by 2 in both orientations of block LL0, HL1 which is the result of high-pass horizontal filtering and low-pass vertical filtering of LL0 followed by decimation by 2, LH1 is the result of low-pass horizontal filtering and high-pass vertical filtering of LL0 followed by decimation by 2, and HH1 is the result of high-pass filtering LL0 in both directions, again followed by decimation by 2 in both orientations. The new resulting DC image in block LL1 appears similar to the original image, but is exactly one quarter the size of the original in both directions due to double decimation by 2 in both orientations.

Figure 2C:
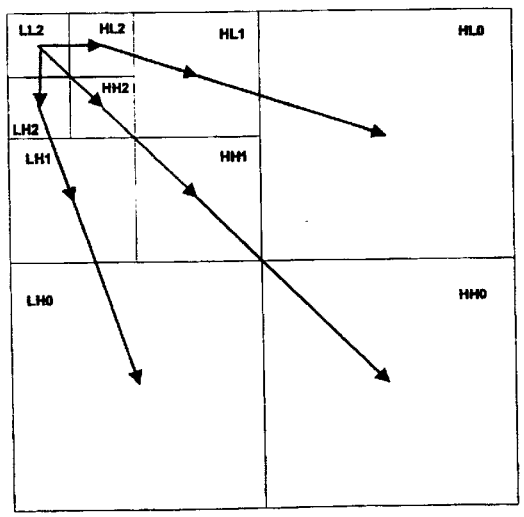

FIG. 2c schematically shows the third level of the transform, wherein blocks HL1, LH1, HH1, HL0, LH0, and HH0 are as before, and block LL1 has been transformed in the same manner as LL0 before, to obtain blocks LL2, LH2, HL2, and HH2.

In general, the four quadrant structure which results from such transform operations is referred to as a "wavelet pyramid" or a "convolution pyramid" with the example in FIG. 2c being a three level pyramid. The blocks of the wavelet transform other than the DC term in the upper left are termed AC blocks, and the levels are referred to as AC levels. The three AC blocks directly surrounding the DC block are termed the highest AC level. As will be apparent, pyramids of fourth or higher levels may be similarly obtained, as desired, by performing additional transformation operations.

Figure 3:
FIG. 3 shows an 8 bit gray scale 256 ×256 pixel image, entitled "Lena", which is commonly used as a test image in compression research.
Figure 4:
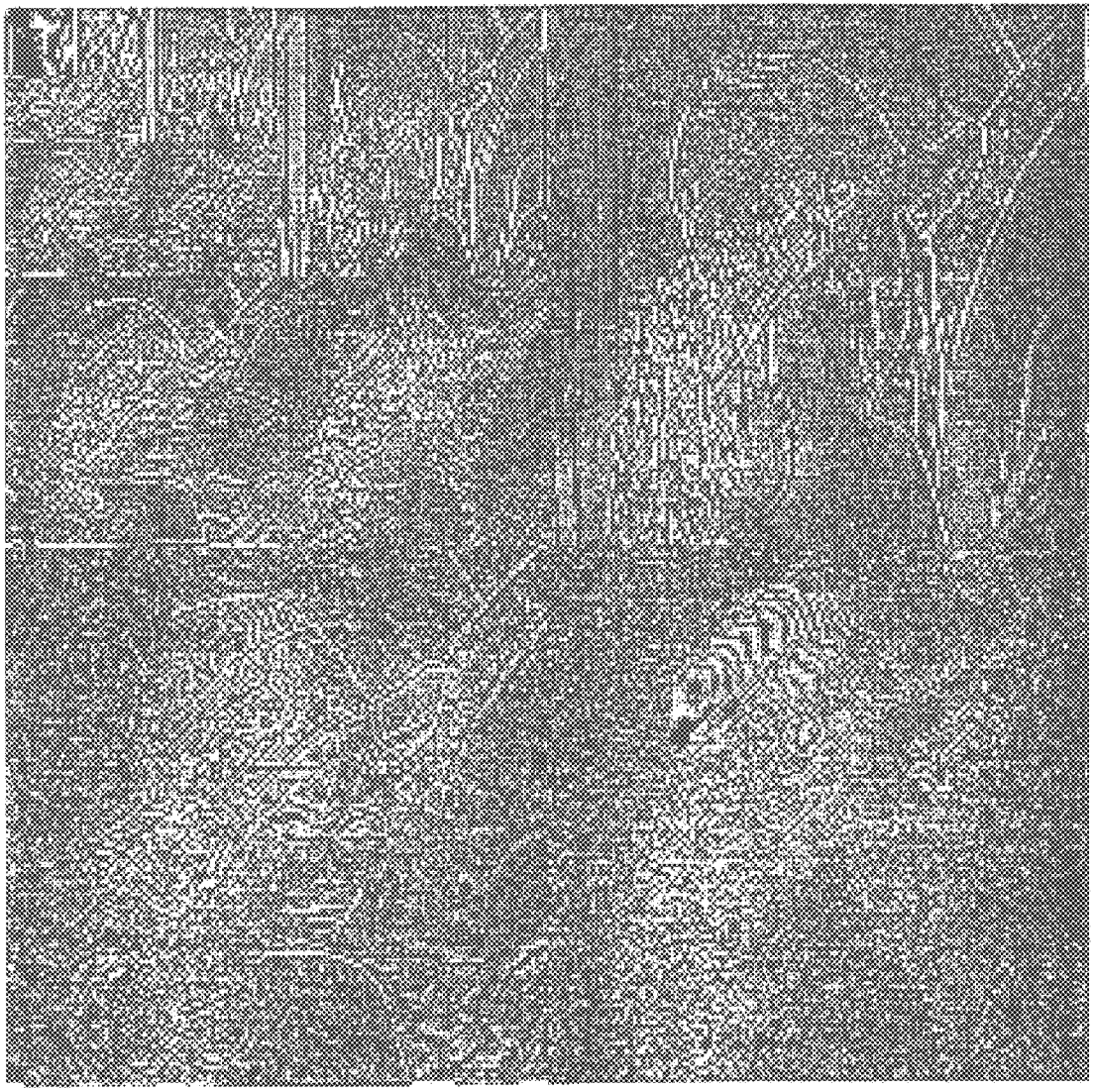
FIG. 4 shows an actual four-level pyramidal convolution of the image in FIG. 3.

FIG. 3 shows a digital test image which is commonly used in image compression studies, referred to as "Lena", and FIG. 4 shows the resulting fourth level pyramid from a four level wavelet transform of the "Lena" image.

Once the desired number of pyramid levels has been processed, quantization of the transformed data can proceed. It can however be advantageous to re-filter the largest AC blocks of the pyramid in both orientations, to further reduce the entropy in this lossless process rather than by severe quantization. This can be useful for perfect reconstruction techniques where no quantization would be permitted, and is discussed further below, with reference to FIG. 8.

Further discussions of pyramidal convolutions are available in: "A Compact Multi-resolution Representation: The Wavelet Model", Proceedings of the IEEE Computer Society Workshop on Computer Vision, Nov. 30–Dec. 2, 1987, pp2–7, Stephane G. Mallat; "Image Compression Using the 2D Wavelet Transform", IEEE Transactions on Image Processing, Vol. I, No. 2, 1992, pp 244–250, A. S. Lewis, G. Knowles; and "The Laplacian Pyramid as a Compact Image Code", IEEE Transactions on Communications, Vol. 31, No. 4, 1983, pp 532–540, P. J. Burt, E. H. Adelson, the contents of each of which are incorporated herein by reference.

The present inventor believes that the pyramid representation gives a reasonable structure to reduce the entropy of image data, and using PR-QMFs, the pyramid process itself will not affect the quality of the reconstructed image.

Three levels of "lossless" compression will now be discussed. The first level is based upon known human visual characteristics, and is referred to as "Visually Lossless Compression".

In Visually Lossless Compression, the reconstructed approximate image is sufficiently accurate with respect to the original image that the differences cannot be perceived by the human eye. This is distinct from the second level of lossless compression, referred to as "Statistically Lossless Compression" wherein the differences between the original image and the reconstructed approximate image are less by a specified amount than the spatially local noise in the image. The third level is true lossless compression where all data are recovered perfectly to an originally specified bit depth.

This last standard relies upon a strict definition of the desired accuracy of representation of the original data, so that rounding the result of a reverse process recovers the "exact original data" to the specified accuracy, since infinite accuracy reconstruction is impossible.

The present inventor has determined that the reduction of entropy (compression) based upon visual system behaviour cannot be easily accomplished in the above-mentioned JPEG or MPEG standards which employ the discrete cosine transform (DCT) as they do not possess the logarithmic scale space of human vision, nor do they represent a spatial location at various frequencies.

In contrast, the use of the pyramid convolution structure in analyzing perceptually invisible or redundant data for the purposes of disposal can be extended to luminance contrast masking, luminance masking of chrominance, scale—threshold masking, scale pattern masking, edge masking, noise masking, and various forms of motion, acceleration, and flicker masking.

Some of these masking issues and descriptions of the characteristics of the human visual system are addressed by Andrew Watson and David Marr, in the following publications: "Vision: A Computational Investigation into the Human Representation and Processing of Visual Information", W. H. Freeman and Company, 1982, David Marr; "Visual Science and Engineering—Models and Applications", Marcel Dekker Inc., 1994, D. H. Kelly, Editor; "Digital Images and Human Vision", A Bradford Book, The MIT Press, 1993, Andrew B. Watson, Editor, the contents of which are incorporated herein by reference; and "Efficiency of a Model Human Image Code", Journal of the Optical Society of America, A, 1987, pp 2401–2417, Andrew B. Watson, the contents of each of which are incorporated herein by reference.

After wavelet decomposition of the image to obtain the convolution pyramid described above, signal processing stage 32 completes by processing the DC block in each color plane of the transform with a lossless coder. Specifically, for the DC block in each color plane, signal processing stage 32 delta-codes one row at a time of the DC block, leaving the first column of the block with its original DC values. When all of the rows have been coded, the first column of the DC block is delta-coded, leaving only the top left pixel of the block uncoded. By delta coding it is meant that a pixel value is replaced with the difference between its value and the value of another pixel in a pre-defined relationship with it. For example, starting with the rightmost pixel in each row, for each pixel in a row (except the first pixel) its value is replaced by the difference between its DC value and the DC value of the pixel to the left of it. Similarly, delta-coding of the first column means that, for each pixel in the column (except the topmost one), starting at the bottom, its value is replaced by the difference between its DC value and the DC value of the pixel above it. By delta coding the rows first, then the DC column which remains, the number of high-valued delta codes is minimized, since the process does not wrap around to the front of the next row down, (which would cause undesired picture edge spikes, similar to the wavelet edge effects described above). While delta coding is currently preferred, the present invention is not limited to delta coding and any other suitable lossless coding techniques may be employed if desired.

Once signal processing stage 32 is completed for an image, quantization stage 36 and/or entropy coding stage 40 are commenced.

Figure 10:
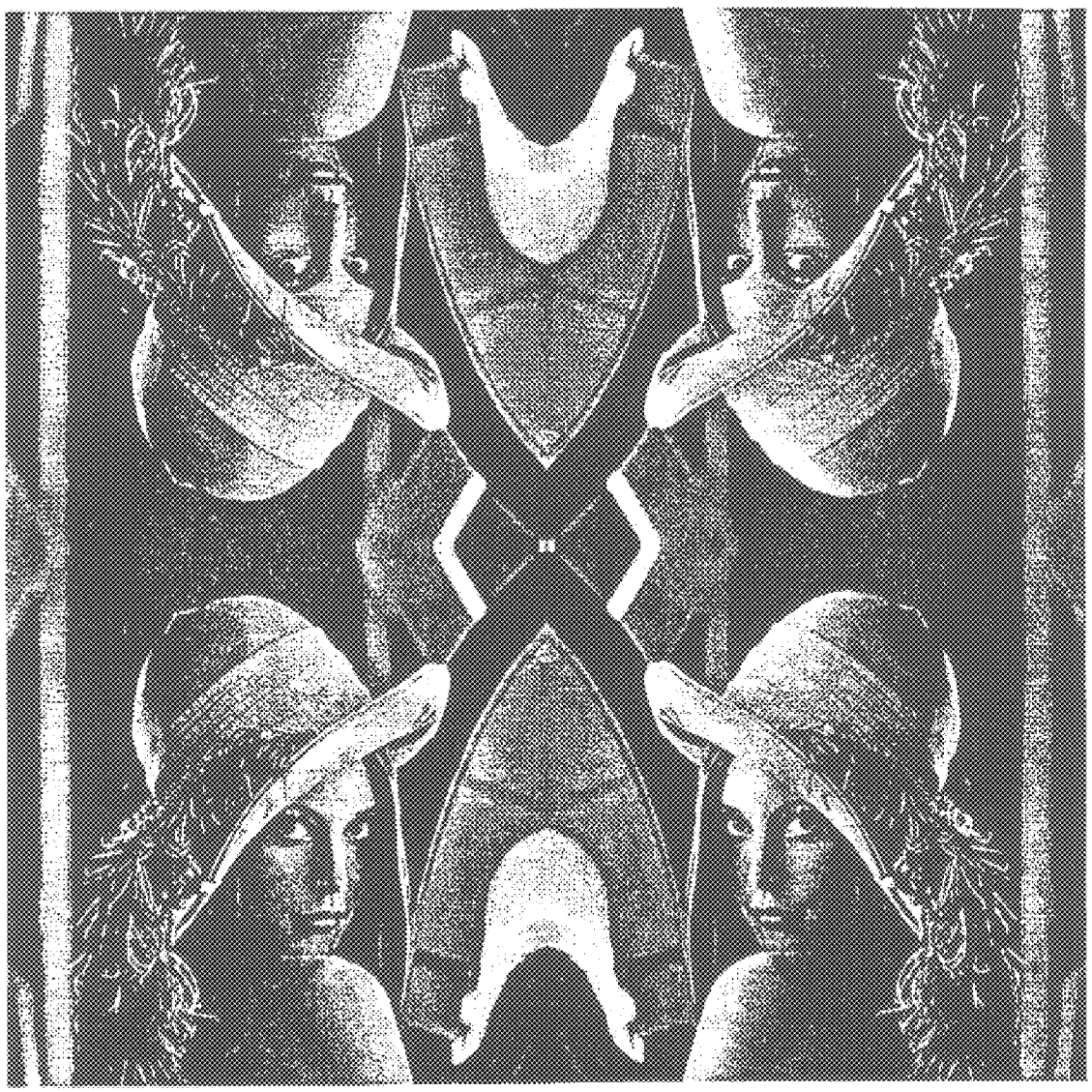
FIG. 10 illustrates the method of tiling four sequential frames of an image to compress movies or television using only one codebook for all four frames if vector coding, and eliminating or greatly reducing wrap around edge contribution to entropy increase in the transform.

As will be apparent to those of skill in the art, multiple images (video, etc.) can be pipelined through stages 24, 32, 36 and 40 of data compression system 20 to increase throughput and operating efficiency. This pipelining can be parallel and/or serial. Multiple images can be tiled and processed simultaneously in parallel processing. This has the advantages that: 1) some images might be harder to compress than others, so a group will always be easier to compress than the worst element; 2) video images which can benefit from inter-frame compression cause jumps in entropy at scene changes so a mosaic of motion video channels results in smaller entropy jumps since most channels will not change scene simultaneously at any one frame; 3) larger images lend themselves to larger statistical bases which can usually result in higher quantizer efficiency; and 4) if the tiling is of several frames in a single video scene instead of inter-frame coding, then any codebook can be shared over the larger resulting image, and the receiver can interpolate data dropouts in intermediate frames, having the bracketing frames available for comparison. For such a process, it is presently contemplated that a 2×2 of sequential images arranged as "mirrors" of their horizontal and vertical counterparts (see FIG. 10), will eliminate the need for special edge treatments, since for typical motion video little would change rapidly along common edges or the outside wrap-arounds between the four frames.

If hardware is used, the various stages can be sequentially (serial) pipelined so that while frame n is in stage 40, frame n+1 is in stage 36, frame n+2 is in stage 32 and frame n+3 is in stage 24. While this strategy might consume much memory, it would permit processing with slower components for any particular frame rate, since the slowest process would be the rate-determining step instead of the entire sequence of processes.

At this point in the compression process, of system 20, two different compression goals may be employed. Specifically, either a Minimum Quality Limit criterion may be employed, or a Maximum Size Limit criterion may be employed. It is contemplated that a user can be presented with a choice between these two criteria at this point, or that a selection may be predefined for system 20, as appropriate. In either case, quantization stage 36 operates to meet one of these two criteria as described below.

Given a fixed bandwidth, such as one television channel, or a single floppy disk, a maximum size limit can be specified for the resulting compressed data output 44, and quantization stage 36 operates accordingly, and thus the quality of the image reconstructed from compressed data output 44 will vary. For medical images, big-screen movies and the like, a minimum acceptable quality level can be specified to quantization stage 36, and the size of compressed data output 44 will vary based upon the image entropy, but the quality of the image reconstructed from compressed data output 44 will always be of at least the specified quality (using whatever quality metric was employed in the compression specification).

A wavelet transform can be thought of in terms of a high-pass/low-pass filter pair with special reconstruction qualities, depending upon the type of wavelet. Similarly, a wavelet transform can be considered as a differentiator/integrator pair. In a wavelet transform, the high-pass, or differentiator, component gives the rate of change of a color plane value with respect to the direction of processing of the Discrete Wavelet Transform (DWT). As the DWT crosses a visual edge, i.e.—an edge in the luminance color space, the rate of darkening or lightening in the image increases and the value of the DWT pixel changes correspondingly.

The present inventor has determined that this gives rise to all of the high-valued pixels in the AC part of the transform and that this data substantially represents the "edge" data of objects in the image.

Many statistical approaches to modeling image transforms involve fitting the histogram curve, as a single mathematical entity, with the intention of using the best curve-fitting equation to allocate bits fairly (applying Lagrange or KKT methods) to the various blocks.

The present inventor has determined that in the luminance plane of the transform, some of the relatively low valued (positive or negative) pixels in the AC blocks of the transform result from "Lambertian" luminance roll-off which occurs near object edges inside an image. These low-valued pixels are therefore sensitive to quantization noise since they constitute a smoothly changing shading in which the human eye can detect minor fluctuations. However, the majority of such low valued pixels represent textures or patterns in the image which can tolerate more noise since the texture or pattern masks easy comparison to adjacent pixels.

Thus, the histogram is actually the result of two superimposed curves, one the result of illumination of three-dimensional objects, the other, a function of pattern, texture, and noise.

Accordingly, as there are two distinct sets of data not identically sensitive to noise or quantization error and differing in population size, the present inventor has realized that they cannot efficiently be treated as one set to be processed by one quantization scheme or quality standard.

Figure 5:
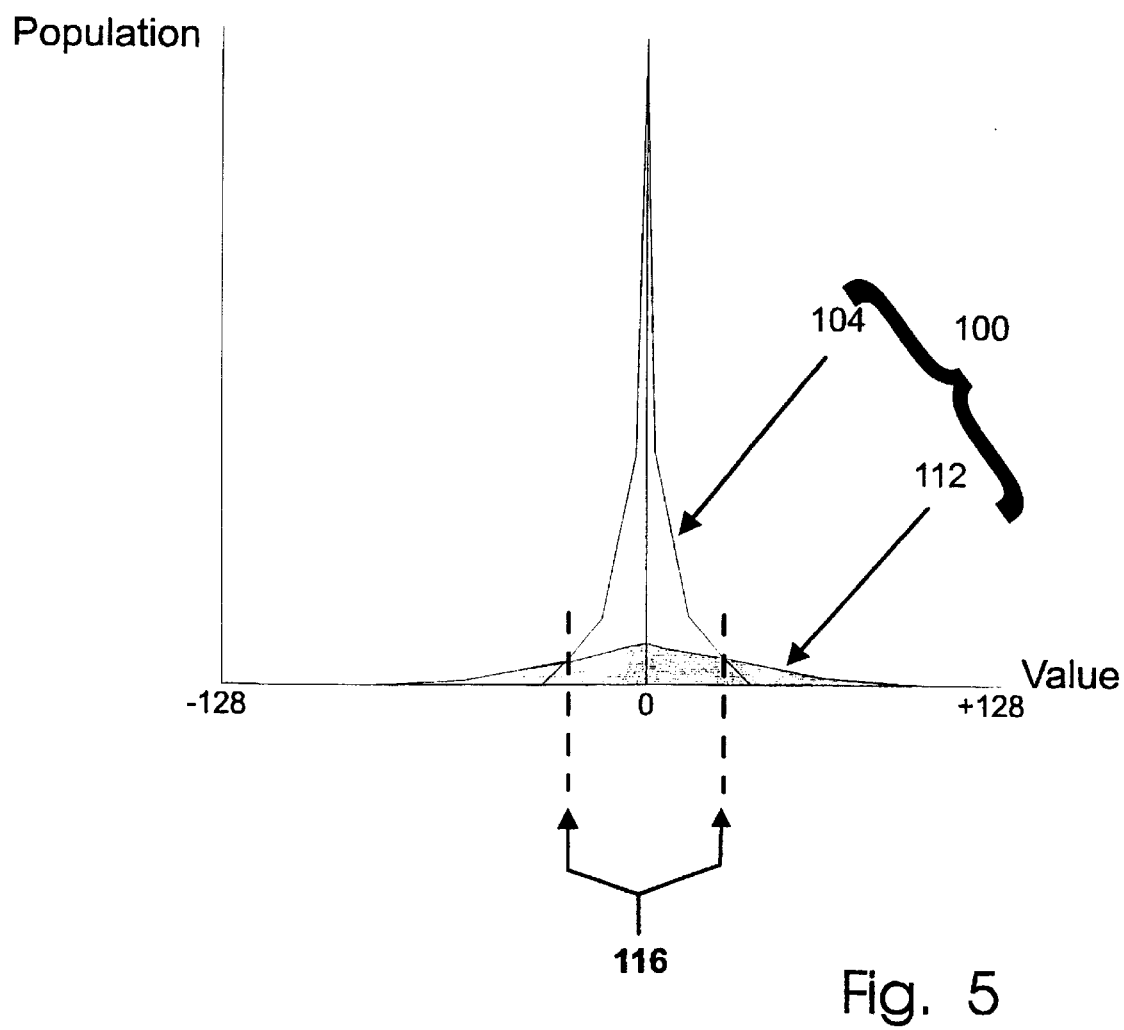
FIG. 5 shows a schematic representation of a typical histogram of the non-DC pixel values of a transformed image.

FIG. 5 shows a typical histogram 100, of the pixel values in the high-pass part of the wavelet transform of an image. The central (Laplacian-type) spike 104, centered near zero represents the texture and pattern information in the image while the shallower and wider (Gaussian-type) plateau, 112, represents the above-mentioned "edges" and information spatially close to real object edges (giving shape information) in the picture. As can be seen, the majority of the pixel values are located in spike 104 and relatively few are found in plateau 112.

The positive and negative high amplitude pixels in the AC part of the transform imply sudden changes in luminance, or color, indicating the edge of an object in the picture. High amplitude edges can hide larger errors than low amplitude ones due to the eye's logarithmic response.

The present inventor has determined that, in order to achieve an acceptable image quality (attaining only non-visible artifacts or at least non-visually offensive artifacts), the disparate information in the curves of FIG. 5 must be quantized in a manner which both reduces the volume of image data and the deterioration of the reconstructed image. Texture luminance variations can be quantized more severely than patterns since the human eye is more sensitive to patterns, while textures and patterns can both be quantized more severely than smooth shape variations. Accordingly, the present inventor has determined that this calls for (at least) two distinct types and accuracies of quantizer.

While there are several methods of quantization available, varying in value prediction strategies, clustering methods, implementation models, error norms, etc., the most fundamental distinction between quantization systems is the number of dimensions. This categorization can be further divided into two types: scalar quantization, such as that taught in "Vector Quantization and Signal Compression", Kluwer Academic Publishers, Chapters 5, 6, and 7, Allen Gersho, Robert Gray, and "Source Coding Theory", Kluwer Academic Publishers Robert M. Gray, the contents of each of which are included herein by reference, wherein each pixel is quantized separately; and vector quantization, as taught in Chapters 10–17 of the above-mentioned Gray reference and in "Vector Quantization", IEEE Press, Huseyin Abut, Editor, also included herein by reference, wherein a series or block of pixels (a vector), is quantized.

Due to the relatively large range of values covered by the relatively small population of object-edge information pixels in plateau 112, and the importance of the gradient of pixels of low amplitude near these object-edges, it is difficult to obtain good results when quantizing the image with a uniform scalar quantizer. This is due to the fact that, if the scalar quantizer has a step size sufficiently large to reproduce the range of values in the object-edges with few bits per pixel, that large step size will cause a visible distortion in the otherwise smoothly varying low-amplitude shape-data near edges. Further, the large step size of the scalar quantizer will also "flatten" any low amplitude pattern and/or texture information embodied in the pixels in spike 104 because of the dead-band around zero caused by the large step-size selection.

If, on the other hand, the scalar quantizer has a step size small enough to properly cover pattern and/or texture data, there will be very little compression due to the large range of fine steps required. If the dead-band which is the null-response zone around the zero point in the quantizer, is widened within the scalar quantizer to reduce entropy, additional pattern and/or texture information will be lost, even if the step size outside the widened dead-band is relatively small.

While a non-uniform scalar quantizer might reduce the entropy at object edges by having a larger step-size for greater amplitudes, such a quantizer would have to give small steps to the data in spike 104 to minimize "dents" near smooth edges and to show textures and/or patterns. This would unfortunately result in a relatively large population of low amplitude data being given high accuracy, so the entropy reduction due to large step-size for the relatively few object-edge pixels would be overwhelmed by the entropy of spike 104.

As is well recognized by those of skill in the art, vector quantizers are very good at maintaining texture and/or pattern information, because a few typical vectors can fill in pattern or texture even with a sparse codebook. However, due to the relatively large range of pixel values in plateau 112, the "codebook" which would be required by a vector quantizer to accommodate these high-amplitude values becomes unacceptably large, reducing its usefulness as a compressor. For example, a relatively poor quality uniform vector quantizer using 15 levels and four pixels per vector needs $15^4$=50,625 vectors to fill a complete vector space. This would require a 16 bit pointer for every four pixel vector, resulting in a compression ratio of only 2:1 (assuming 8 bit pixels) before entropy coding. Further, a 15 gray level picture is not particularly smooth, even if the quantization process occurs in transform space. A more realistic and acceptable uniform vector quantizer for image compression, with 33 levels per pixel, would require 21 bits per vector or 5.25 bits per pixel and only provides a 1.5:1 compression ratio before entropy coding.

This discussion above of vector quantization has been deliberately over-simplified in order to demonstrate more clearly the fundamental problems involved in high quality compression of arbitrary images. As will be apparent, the codebook can be reduced well below the full-space codebook size by most forms of vector quantization for most reasonable images, but image entropy and visual content still dictate the compression-vs-quality performance for any single quantizer, so the difference between an "optimal" quantizer and the primitive one illustrated above disappears given a "pathological" image. The true test equally applied to any quantization strategy must be a worst-case image which uses a large volume of vector space with many visual-error sensitive low amplitude, smooth gradation pixels and a wide well populated range of patterns and textures.

In this limiting case, the vector space required for high visual quality begins to approach the size of the primitive example above.

It will be shown that by using two different quantization strategies, separating high amplitude data from low and organization using spatial information and pyramid structural redundancy, the present invention can obtain a size-vs-quality ratio below that attainable by any single quantization strategy of which the present inventor is aware.

Accordingly, the present inventor has determined that an advantageous image compression method and system can be obtained by differentiating the class of quantization used for the relatively few, high absolute-valued pixels (those which fall within plateau 112) and the class of quantization used for the relatively many, low absolute-valued pixels (those which fall within spike 104) because each data set exists at substantially different regions of the image histogram. Specifically, a scalar quantizer can favorably be employed on the pixels in plateau 112 while a vector quantizer can be favorably employed on the pixels in spike 104.

The operation of the two quantizers is separated by a division point 116 which is selected such that either the overall entropy-coded data size is minimized for a given image quality or the resulting compressed data output 44 is less than a given total size, and so that the division occurs between adjacent bit planes (i.e.—powers of two), or a pair of absolute magnitudes. By setting an appropriate division point 116 for the two quantizers, the range of values which will be processed by the vector quantizer is reduced, as is the number of pixels which the scalar quantizer must process.

Accordingly, the advantages of each quantizer may be employed beneficially and the disadvantages of each quantizer are obviated or mitigated. Specifically, one method of allocating division point 116 is to assume that the scalar quantizer for plateau 112 is lossless, or visually lossless, and that the vector quantizer processing spike 104 is responsible for all (visual) quality degradation to be allowed in the image. The image, degraded to the acceptable quality level, is quantized to the third, fourth, fifth etc. bit plane from the top significant plane, by the first scalar quantizer, and its entropy-coded size is determined for each bit plane and stored. The second (vector) quantizer is applied with a specified acceptable degradation criterion, to the remaining bit planes, and its entropy-coded size is determined for each bit-plane. The pairs of stored sizes determined for the pairs of bit allocations are then compared and the quantized data sets for the division point which provides the lowest overall data size are stored with the rest being discarded.

Entropy in imaging is measured in bits per pixel (for each color plane). Since what needs to be known is total bits per quantizer, the value of interest is the entropy (for a particular quantizer) times the number of pixels transmitted (in each color plane) using that quantizer, summed for all color planes. Each quantizer will have a total number of bits required for a given quality and bit-plane allocation, and the lowest sum for both quantizers for any given bit-plane division at a fixed quality will be the desired data size and bit-plane allocation scheme.

For example, quantizing to a preselected target quality, the first (scalar) quantizer may attain a size of 4,000 bits quantizing down to the sixth bit-plane from the bottom (inclusive), 8,000 bits quantizing down to the fifth bit-plane from the bottom (inclusive), 28,000 bits quantizing to the fourth bit-plane, and 80,000 bits quantizing to the third bit-plane. The second (vector) quantizer would have to vary the size of its codebook or change its distribution among vectors to keep a given quality for varying bit-depths (and populations), and may thus attain a size of 96,000 bits quantizing from the fifth bit-plane from the bottom down (inclusive), 80,000 bits quantizing from the fourth bit-plane from the bottom down (inclusive), 56,000 bits quantizing from the third bit-plane from the bottom down, and 36,000 bits quantizing the bottom two bit-planes. Thus the bit sums for the 5/6 bit-plane split would be 100,000 bits, for the 4/5 bit-plane split: 88,000 bits, for the 3/4 bit-plane split: 84,000 bits, and for the 2/3 bit-plane split: 116,000 bits. The quantizer bit-plane division point would thus be selected between the third and fourth bit-planes to obtain the best overall data size (in this example a compression of 6.24:1) for the image data at a given fixed quality.

While the following discussion illustrates the use of a lattice or Equitz PNN quantizer to deal with the lower amplitude image data in spike 104, any suitable, quantizer can be employed, as will be apparent to those of skill in the art, if sufficient control over the compression ratio for a given amplitude of error is available.

As mentioned, the vector quantizer of the instant invention is not particularly limited, and the present inventor presently prefers to employ either a lattice quantizer with spherical or pyramidal codebooks, or an Equitz' Fast Pairwise Nearest Neighbour quantizer (PNN), which can then be constrained to lattice points. The Equitz algorithm is believed to be well suited to progressive real-time calculation of the rate-distortion curve which permits direct stopping at an entropy or quality level. Other good vector quantizers such as the LBG algorithm described in, "An Algorithm for Vector Quantizer Design", IEEE Transactions on Communications, Vol. COM-28, January 1980, pp 84–94, Y. Linde, A. Buzo, R. Gray; a trellis coder described in, "Tree and Trellis Coding" (Ch.15), "Vector Quantization and Signal Compression", pp 555–586, A. Gersho, R. Gray; or a neural quantizer with suitable rate-distortion control described in, "Neural Network Approaches to Image Compression", Proceedings of the IEEE, Vol 83, No. 2, February 1995, pp 1–16, R. Dony, S. Haykin; and flexible quality metric can also be employed, as will be apparent to those of skill in the art.

The lattice quantizer presently preferred is similar to that taught in "Fast Quantizing and Decoding Algorithms for Lattice Quantizers and Codes", IEEE Transactions on Information Theory, March 1982, Vol. IT-28, pp 227–232, J. H. Conway, N. J. A. Sloane, and "A Fast Encoding Method for Lattice Quantizers and Codes", IEEE Transactions on Information Theory, November 1983, Vol. IT-29 #6, J. H. Conway, N. J. A. Sloane and the contents of these two publications are incorporated herein by reference.

This lattice quantizer preferably employs either spherical codebooks as taught in "Vector Quantization and Signal Compression", Kluwer Academic Publishers, Allen Gersho, Robert M. Gray, pp 474–476, or pyramidal codebooks as taught in "A Pyramid Vector Quantizer", IEEE Transactions on Information Theory, Vol. IT-32, July 1986, pp568–583, T. R. Fischer, and "A Pyramidal Scheme for Lattice Vector Quantization of Wavelet Transform Coefficients Applied to Image Coding", ICASSP-92, 1992, Vol. 4, pp 401–404, M. Barlaud, P. Sole, M. Antonini, P. Mathieu and the contents of these publications are incorporated herein by reference.

The Equitz' Pairwise Nearest Neighbour quantizer presently preferred is discussed in, "A New Vector Quantization Clustering Algorithm:", IEEE Transactions on ASSP, Vol. 37, October 1989, pp 1568–1575, William Equitz, the contents of which are incorporated herein by reference.

As the percentage of lower value pixels is relatively high (as shown by spike 104 in FIG. 5), they can be well quantized by the lattice or PNN quantizer described above. Further, as all of the relatively high amplitude pixel bits in plateau 112 are directed to a separate dedicated quantizer described below, the number of possible discrete vectors to be handled by the vector quantizer selected is sparse, and thus a smaller codebook can be transmitted or a predefined set of near-optimal codebooks can be maintained at the transmitter and receiver, thus removing the need to transmit a codebook entirely.

As is known by those of skill in the art, a conventional approach for grouping luminance channel vectors is to employ a two by two adjacent pixel square block as the vector. This has the advantage of simplicity, and for smooth images, close pixels in a block will usually be similar away from edges, reducing entropy of the quantizer.

While such a two by two square grouping can provide acceptable results, in a preferred embodiment of the present invention the vector is composed of a triad made from pixels in the same pyramid level, one from each orientation, at corresponding locations in each orientation block. This technique reconstructs the image transform more naturally, as a contribution to an image pixel requires each orientation of the transform pixel at any scale in the pyramid. Further, pixels in the same pyramid level, at the same relative location in each orientation block represent the same scale and spatial location in the original image and are therefore likely to be very similar, so that triads will primarily lie along the main diagonal of the vector-space cube. This technique provides a further advantage in that, unlike the conventional two by two square block technique, even object edges tend to be of similar amplitude in each orientation of a given pyramid level, so that edge vectors also lie along the diagonal, thus reducing entropy even further. Vectors whose components are identical (after quantization) can be treated as scalars since a large part of the vector population can be dealt with as a line and not a volume.

The transform color planes can (if treated with a vector quantizer) be handled as pairs of Cr and Cb pixels at a given location in the transform plane. As discussed above, for homogeneous color regions Cr and Cb will be largely constant, and many Cr-Cb pairs will share the same vector, so that a codebook of existing Cr-Cb pairs can have as little as half the entropy of individually processed color planes. Such pairing can be in addition to the scale/orientation triad grouping described above, yielding a six-dimensional vector space for the Cr-Cb plane vector quantizer.

As a transform has a population of pixel values which are roughly symmetric about zero in histogram 100 (the probability density function), assuming that the data is in, or can be converted to signed magnitude format and the sign dealt with separately, as described below, it is statistically reasonable to deal with absolute values of pixels in the following technique.

As is the above described case for the vector quantizer, the present invention is not limited to use with a particular scalar quantizer. In a preferred embodiment a modified zero-tree quantizer, similar in concept to that described by J. M. Shapiro in "An Embedded Hierarchical Image Coder Using Zero-trees of Wavelet Coefficients", DCC '93, Data Compression Conference, pp 214–223, the contents of which are incorporated herein by reference, is the basis of the system employed as the scalar quantizer for high valued edge data in plateau 112. The present inventor has determined that, since the number of higher bit values decreases in almost all images as their value increases, and since these higher value pixels contribute only a small part of the image data (typically 2–10%), they can be relatively efficiently quantized by a properly implemented zero-tree quantizer.

Unlike the zero-tree quantizer taught by Shapiro, the modified zero-tree quantizer employed in a preferred embodiment of the present invention does not perform the constant re-ordering and shuffling of the dominant and subordinate lists taught by Shapiro. In fact, no list is required and thus, much of the complexity of the original technique taught by Shapiro is avoided by not requiring the strict hierarchical transmission capability. Perhaps even more significantly, the re-quantization to a different step size required by the zero-tree quantizer taught by Shapiro is avoided, thus preventing "bruising" or "denting" of the image data as a result of re-quantization, as is discussed further below. An additional perceived benefit is the greater simplicity of the algorithm, and the associated increase in processing speed and decrease in computational requirements. Further, no threshold or threshold division by two is needed, since the original data is not scanned one bit plane at a time. It is instead raster scanned through the highest AC blocks near the DC block, then down trees, reading and storing pixels between the maximum transform amplitude down to a division point specified as the lowest amplitude allocated to the zero-tree. below this point, a vector quantizer is to be employed.

Instead, the modified zero-tree quantizer developed by the present inventor locates the data trees at the edges of objects in the image using an algorithm described below, with reference to the pseudocode subroutine fragments shown in Appendix B and specifically at Sub Zero Tree Coder ( ).

In the example pseudo code of Appendix B: 'Color' refers to the Y, Cr, and Cb color planes of the wavelet pyramid transform; 'Amplitude' refers to absolute values, unless stated otherwise; 'Level' refers to all orientations of a single scale in the wavelet pyramid where the lowest level refers to the finest detail which is present in the largest blocks of the wavelet pyramid transform; 'Block' refers to one orientation of one scale of the wavelet pyramid transform; the horizontal block 'HorBlock' is the upper right quadrant in a scale; the vertical block 'VerBlock' is the lower left quadrant in a scale; the diagonal block 'DiagBlock' is the lower right quadrant in a scale; and the terms 'pixel' and 'pel' are used interchangeably in the code to refer to a value stored in a single address of the transform space of a single color plane. Also, labels enclosed in double quotation marks in the pseudocode are subroutines.

In use, the modified zero-tree coder scans each color plane in turn, searching for newly significant pixels in the dominant pass, and in the subordinate pass adding amplitude information, to those pixels found significant in the dominant pass. As used herein, the term "newly significant pixels" comprises pixels whose absolute values place them in the zero-tree and not the vector quantizer.

A fundamental modification to the coder is the split data set allocated to the different quantizers. Sparse, large-amplitude, low-population data do not compress well with vector quantizers because the pointer-to-codebook structure only becomes efficient when a few prototypical codebook vectors can accurately represent a large population of vectors. Therefore, this type of data might just as well be scalar quantized, and a suitable way of disposing of unnecessary low amplitude data is by employing a zero-tree which only transmits non-zero information. It may be thought of as an efficient scalar quantizer. Similarly, a zero-tree quantizer's output inflates radically if it is required to fill in the lowest level tree structure for much of the lower amplitude data, since most of that is in the terminal tree branches, and since the visual information at that level is not nearly as critical to image reconstruction as the higher levels it is a waste of the coder's time. On the other hand, the wavelet transform's histogram clearly shows that for typical images the low absolute valued data has a very high population, which is ideal for vector quantizing. Thus, the optimum allocation of quantizers involves applying the zero-tree to the low population—high amplitude edge information in the picture (see FIG. 5, curve 112 going out positive and negative from thresholds 116), and leaving the mountain of low amplitude texture and noise for the vector quantizer.

The criterion that is presently preferred is that the threshold be placed symmetrically on either side of zero where curve 104 crosses curve 112. For extreme compression the vector quantizer would not even be started, but if bit rate is still available after the zero-tree codes its domain, or if the user has specified a higher quality criterion instead of size, then the lattice or nearest neighbor quantizer codes all pixels in its domain and reduces its Voronoi regions to reach a best size for a given quality. Additionally, as described elsewhere herein, the vector space need not send a pointer for every vector, but only for the highest energy ones, and the vector pointers can be embedded in the zero-tree without the need for addressing, by just adding a few symbols to the structure.

For each color plane. the modified zero-tree coder loads the corresponding wavelet transform and determines the highest occupied bit plane (searching non-DC block pixels only) regardless of the pixel's sign. The lowest bit plane or lowest amplitude to code to (i.e.—the division point) to be examined by the modified zero-tree coder is determined by the external algorithm as described above.

In the "Single Bit Plane Scanned at a Time" process, for each bit plane assigned to it, the coder scans each AC level of the wavelet pyramid in order, from the level closest to the DC block, to the largest and lowest level (level 0), in the manner described below.

Starting with the level closest to the DC term, the modified zero-tree coder raster scans all three orientation blocks in the level in parallel, searching for newly significant pixels. The raster scan is performed row by row from the top down, left to right, and all pixels in a level are examined before the next level's orientations are raster scanned. This means that, in a given level, the coder inspects a corresponding pixel for each orientation (a triad composed of one horizontal, one vertical and one diagonal pixel at the same relative location in each block in the current level) to determine if any orientation of that location is present in the current bit plane and has not yet been tagged as significant.

Figure 6:
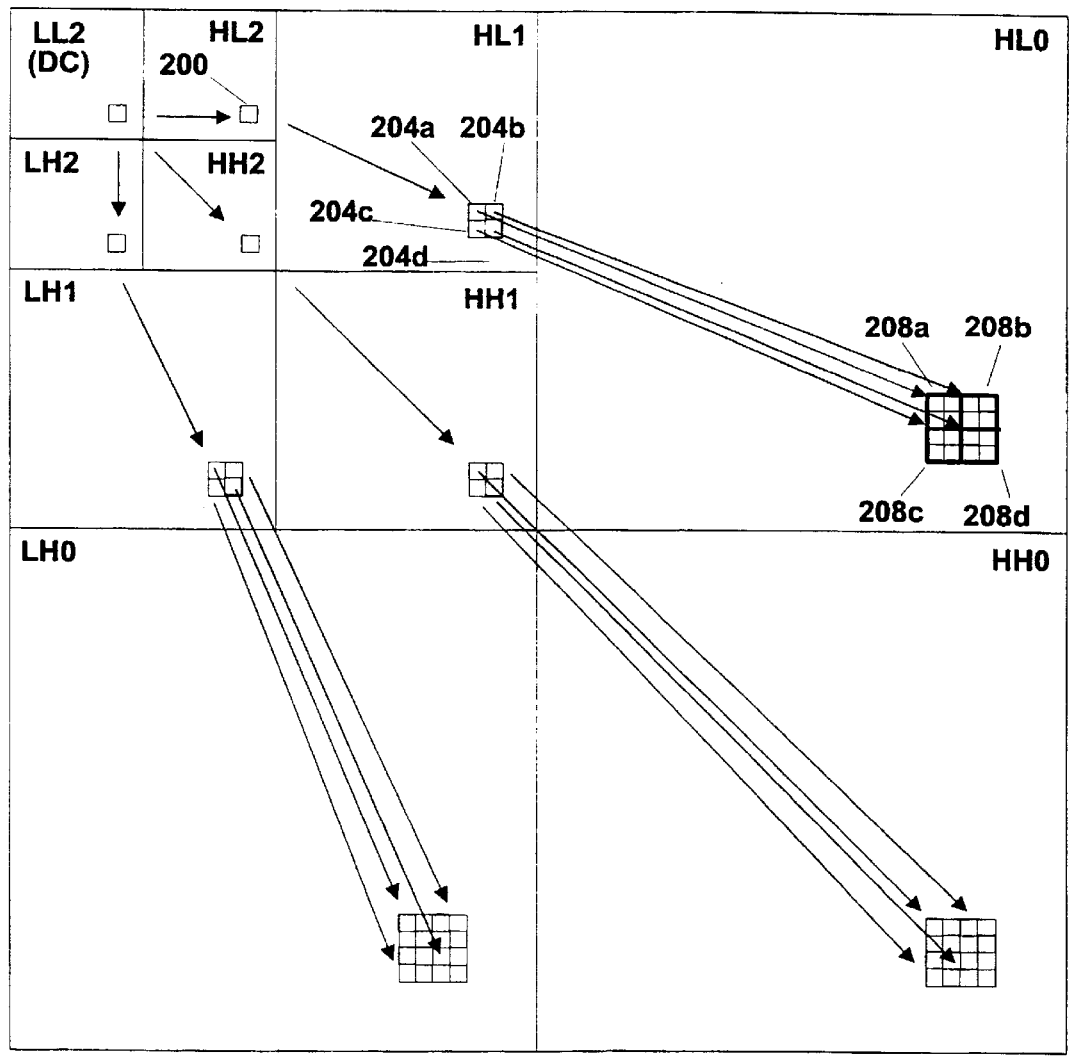
FIG. 6 illustrates the spatial relationships between pixels in the various blocks of a pyramidal single pass transform space.

A pixel at any level except for the lowest level is deemed the parent of a two by two pixel quad in the next lower level representing the same location and orientation in image space, and these pixels are deemed its children. These spatial relationships are shown schematically in FIG. 6 wherein pixel 200 in block HL2 is the parent of the two by two pixel quad 204 in block HL1 and each of the pixels (204a, 204b, 204c, 204d) in quad 204 is the parent of a respective two by two quad 208a, 208b, 208c, or 208d respectively, in block HL0. Any parent pixel such as 200, with multiple "generations" of children, such as those in quad 204 and in quads 208a, 208b, 208c, and 208d is termed the ancestor of all of those pixels. The "oldest" (highest level) parent found newly significant in an orientation tree is called a data-tree root.

If any one or more of the three pixels is newly significant, its address is tagged as significant, the corresponding address of the horizontal block pixel at the current level is delta-coded from any previous significant data-tree root address in the address data stream, and this address value is itself placed in the address data stream.

Figure 7:
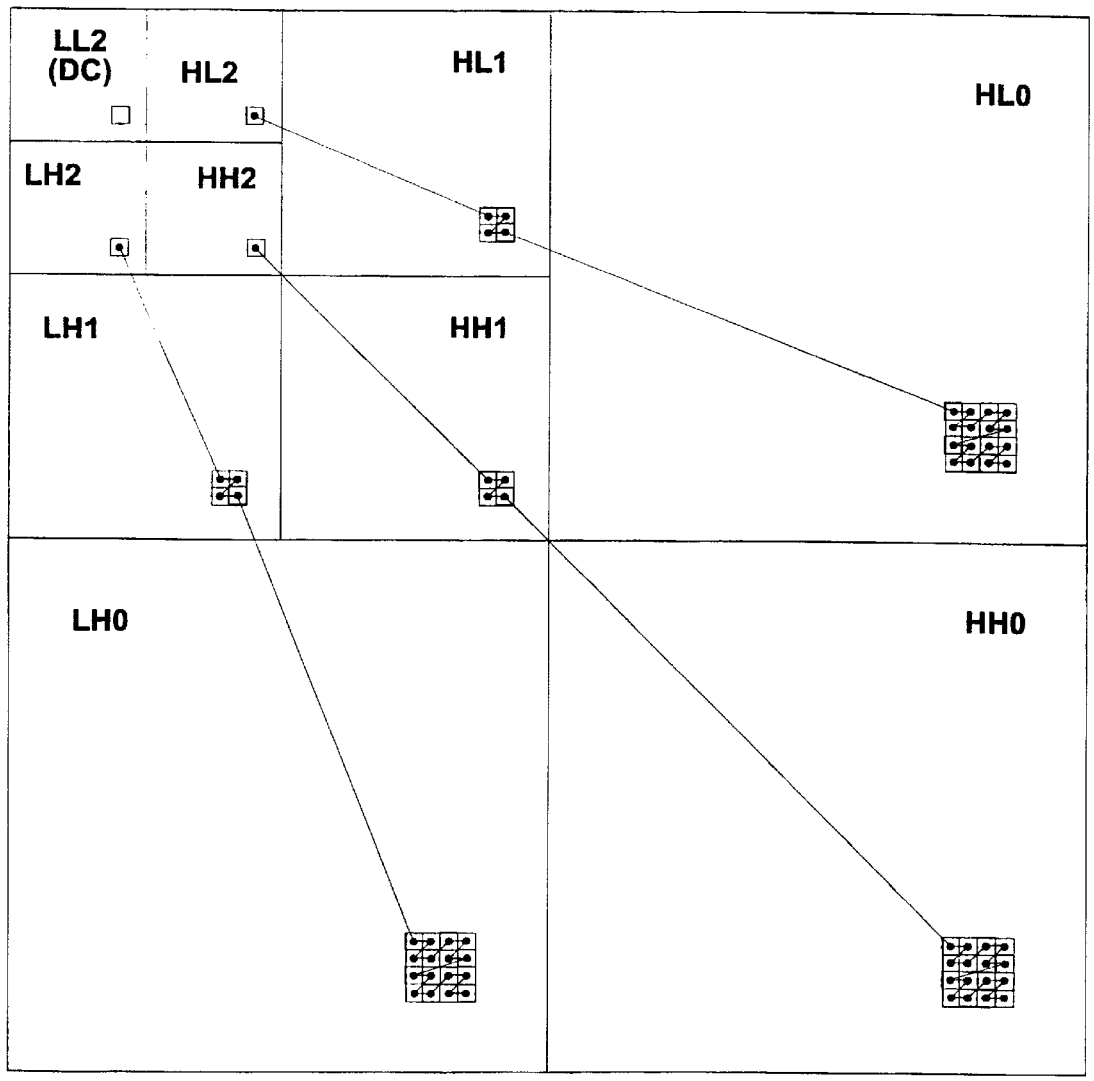
FIG. 7 illustrates the spatial relationships in a version of a "Morton scan" pattern employed in evaluating trees in a three-level pyramid.

The three orientations of data-trees are scanned for newly significant pixels at the current bit plane from each of the three ancestor pixels in the current level being raster scanned, down to level 0 inclusive, using the scanning process illustrated in FIG. 7, referred to herein as the Morton scanning process. Since edge data generally occurs in lines of various orientations, with a minimum width of two pixels (a negative side and a positive side), using a two by two scanning pattern will collect more edge terms together than a simple raster scan, thus helping to reduce the image entropy. If a newly significant pixel is found, its address is tagged as significant and it is labeled with its sign. If a pixel is insignificant or previously significant, it is assigned an embedded zero.

Once the trees for the current triad of ancestor pixels have all been scanned, they are examined for zero-tree roots. A zero-tree root is defined as a pixel which is itself zero, is not a descendant of a previous zero-tree root and whose descendants are all zero. If a zero-tree root is found in a data-tree, it is labeled as a zero-tree root and all its descendants are removed from the tree (i.e.—are pruned). Once this has been done, the data tree consisting of symbols for positive values, negative values, embedded zero values and zero-tree roots is placed in the dominant data stream one orientation at a time, in the Morton scan order.

The modified zero-tree coder then proceeds to inspect the next pixel triad in the current hierarchy, raster scanning all of the triads at the current level until the level is exhausted. The coder subsequently proceeds to raster scan triads in the next level down, in the same fashion until all pixels have been scanned for significance at the current bit plane. Once a dominant pass is completed for a bit plane, one of two alternatives may be employed to transmit or store absolute values for the significant pixels just found in the previous dominant pass.

The first, and more elaborate alternative for transmitting or storing absolute values involves transmitting (or storing) the next lower plane's bit value for each pixel previously found to be significant in any bit plane, in the order found in all the previous dominant passes. This method, identified as "Detailed Method" in Appendix B, refines all significant pixels one bit plane at a time i.e.—"progressive transmission", but suffers from the fact that if the data transmission stream stops prematurely, (or stored information is lost), the resulting reconstructed image is equally bad across the whole image, edges included, and has little fine detail and poor shading smoothness appearing as dents and bruises near edges.

The second alternative is presently preferred and is identified as "Simplified Method" in Appendix B. This method is somewhat simpler and involves transmitting (or storing) in the subordinate data stream, for each pixel found newly significant in the previous dominant pass, all bits except for the sign which is transmitted in the dominant pass, from the next lower bit plane, down to the bottom bit allocated to the zero-tree coder. This transmitted (stored) value can be the truncated value if the vector quantizer will handle the bits below the zero-tree's data, or it can be appropriately rounded to reduce entropy. One of the perceived advantages is that, if the data transmission is cut off after a few bit planes (or the stored file is truncated or damaged), the resultant image may be devoid of pattern and texture detail (depending upon where in the data stream the interruption occurred), but edges and their neighboring pixels which give the perception of three-dimensional shape can be well defined and reasonably contoured, since sufficient data was transmitted (stored) for the non-zero transform pixels. A further perceived advantage is that this alternative avails itself of grouping similar amplitude subordinate pass data into vectors, which is not possible in Shapiro's implementation.

The process jumps down one bit plane after the subordinate pass, if there is another bit plane assigned to the zero-tree coder. All color transform planes are zero-tree coded similarly, with the possible exception that for sub-sampled color planes the lowest level (level 0) can be removed before coding begins to reduce entropy, and the color planes can be coded to a different lowest bit plane, if required to satisfy visual perception rules.

The subordinate pass can be performed either transmitting (storing) the next bit plane down for all previously significant data, or transmitting (storing) all bits assigned to the zero-tree coder for all data found significant in the previous bit plane.

It should be noted that the zero-tree coder can be assigned to keep an arbitrary number of bits for a significant datum regardless of how many bit planes are scanned by it, searching for newly significant data. This is useful in keeping uncorrelated data out of the vector quantizer described below, by assigning a zero in the vector quantizer to any pixel coded by the zero-tree coder. In the pyramid structure used, each level typically requires twice as high accuracy due to human visual sensitivity rules deduced by Marr, as the larger level below it (containing finer detail), for consistent reconstructed image quality, and therefore, an advantageous method would keep one less bit-plane or value in the coder at each lower level of the pyramid, which the present inventor refers to as "terracing".

The "Single Pass Zero-Tree" is an alternative to the "Single Bit Plane Scanned at a Time" process which is useful if the "Simplified Method" in Appendix B is used, involves determining the optimum division point for allocating bit planes to the zero-tree and the vector quantizer, and then employing the modified zero-tree coder to scan for all pixels large enough to be present in the bit planes allotted to the zero-tree, in largest to smallest magnitude order, placing the data root addresses and symbols into the dominant pass data as above, and placing the absolute magnitudes of the pixels to bit depths as defined above, in the subordinate pass data. This approach will greatly reduce the address data, and reduce the number of embedded zero elements in the zero-tree, as there will only be one zero-tree pass instead of one pass per bit plane.

As stated above, once a single pass zero-tree is used, the AC blocks at the highest level can be raster scanned with little storage overhead since these blocks must be sent almost perfect anyway. once the top AC level is scanned, the embedded symbol set reconstructs the image trees without the need for any address stream. Then, by adding the appropriate symbols, a pixel at level n+1 can indicate to the vector quantizer decoder that along with any possible quad of child pixels at level n in the zero-tree, the next vector in the vector stream data belongs to the low amplitude data associated with the level n child quad.

The Zero-Vector-Coder, an extension of the zero-tree principle, uses the following symbol set (as will be apparent to those of skill in the art, the actual characters have no specific significance, as any three bit symbol will do):

| | | |
|---|---|---|
| + signif. +ve, | datatree children exist, | no child vector |
| − signif. −ve, | datatree children exist, | no child vector |
| v signif. +ve, | datatree children exist, | child vector |
| 0 embed. zero, | datatree children exist, | no child vector |
| x embed. zero, | datatree children exist, | child vector |
| R zerotree root, | no datatree children exist, | no child vector. |

-continued

*optional end-of-branch symbol for resynchronization of transmission due to data errors.

The operation of each of the two compression space strategies mentioned above are now described. While the operation of these strategies described herein is presently preferred, it will be understood that other appropriate implementation methods can be employed, as desired.

For the "Minimum Quality Limit" strategy, an appropriate quality limit is specified for each color subband, through a preselected suitable metric such as Peak Signal to Noise Ratio (PSNR), Mean Squared Error (MSE), L1 distortion, etc. The histogram of each color subband of the image is then examined to determine the probability density function (histogram) bit division value required to obtain the selected quality level. Quantization stage 36 (which will include any rounding used in the zero-tree coder and any quantization performed by the lattice or Equitz methods) and lossless coding stage 40 proceed with the highest bit plane data being zero-tree coded and then losslessly (entropy) coded.

The process then proceeds similarly for the second-highest bit plane of the image data, then for the third bit plane, etc. until the specified quality criterion (MSE, PSNR, etc,) is met.

The code sizes of the lossless coded zero-tree data are recorded, from the highest populated bit plane down to each successive bit plane separately. (At this point in the process, the zero-tree coded data and the bit planes below it constitute a perfect reconstruction before any bit planes below the zero tree are vector-quantized in the following step.)

Next, the last bit level of the zero-tree whose coding resulted in the specified quality limit being met is transferred (including signs +/−) to a vector quantizer, and this bit plane and any bit planes below it down to 0 are vector quantized, with either a (three or four dimensional) lattice if a lattice quantizer is used, or by applying the Equitz PNN algorithm on the (three or four dimensional) vector space. In both cases the quality and entropy are reduced simultaneously by the vector quantization process on the lower bit planes, and both quality and entropy are measured as the vector quantization proceeds, with the quantization process ceasing when the quality limit would no longer be met.

As will be apparent, in the case of a lattice quantizer, entropy reduction is accomplished by mapping a more sparsely spaced lattice onto the vector data. For the PNN method, entropy is reduced by merging pairs of neighboring clusters, adhering to visual criteria for judicious selection of the cluster pairs to be merged. If the quality criterion is 'overshot', the process can be backed up to the previous entropy level by using the previous lattice spacing and codebook in the case of a lattice, or by un-merging the last pair of PNN clusters in the Equitz case. The lattice or the PNN data are then lossless coded, as appropriate, and the size of the resulting data (with lossless coded codebook size, if required to be transmitted) is added to the size of the lossless coded zero-tree, coded to the bit plane above this vector quantizer to obtain the size of the composite quantized data.

If the resulting total size is smaller than the previous bit-depth of encoded zero-tree plus any encoded vector space generated below this previous zero-tree (non-existent on first vector quantizer pass), then the process is repeated taking one more bit level from the zero-tree coder for processing by the vector quantizer. This is due to the fact that, because of the statistics of a typical transform, if entropy is reduced by moving a bit plane from the zero-tree to the vector quantizer, the entropy versus quantizer-division curve is descending, and there may yet be a lower entropy split left to test. In the case of a first pass, the entropy coded vector quantizer's size contribution would be zero, so that one would compare the entropy coded zero-tree minus bottom bit plane plus entropy coded vector quantizer (and codebook) below it only to the size of the entropy coded zero-tree coded to the last bit plane required to meet the quality criterion.

This process repeats until the resulting composite lossless coded data size is larger than the previous resulting data size, at which point the previous result is adopted as the minimum in the entropy vs bit plane allocation curve at a given quality has been passed. The bit planes assigned to the zero-tree can be coded using the "Single Pass Zero-tree" before encoding the lower bit planes with the vector quantizer. If using child quads in this process instead of triads, especially in the single-pass zero-tree coder, quantization and lossless coding are performed one block at a time.

If a Maximum Size Limit is selected, then quantization stage 36 and lossless (entropy) coding stage 40 proceed with the above-described modified zero-tree coder being used to code bit planes from the highest populated plane down as in the case of the minimum quality process above, until the size criterion is just passed, or until the image has run out of bits, whichever comes first. Of course, the image will rarely, if ever, run out of bits first unless the maximum size limit has been set unreasonably large.

Next, lossless coding is performed on the resulting zero-tree, separately, for each successive bit plane depth (using either the "Single Bit Plane Scanned at a Time" process or the "Single Pass Zero-Tree", and the resulting code sizes are recorded. Next, the vector quantizer is used to quantize the bits from the bottom bit of the zero-tree down to 0 inclusive, on sets of pixels (grouped as described above) either by employing a lattice code or by applying Equitz' PNN algorithm. During this process, the entropy and quality are recorded until the entropy-based size of the vector quantized data and any codebook, plus the size of the entropy coded zero-tree data reaching the bit above the vector quantizer data has met the maximum size criterion.

In circumstances wherein compression speed is required over quality, the algorithm can cease with this combination. In circumstances wherein the best quality is required at the desired size, then the vector quantizer is invoked again with it being inflated by one bit plane removed from the zero-tree code. The appropriate entropy reduction method is applied, keeping track of entropy and quality, until the entropy-based size of the vector quantizer and any codebook, plus the size of the entropy coded zero-tree reaching the bit above the new vector quantizer has met the maximum size criterion. The quality of this quantizer pair is then compared to the previous quantizer pair.

If the quality has improved at the specified data size, the vector quantizer is again inflated by one bit plane taken from the zero-tree and the process repeated. If the quality is not improved, then the previous zero-tree/vector quantizer pair is used, as the process has passed the maximum in the quality vs bit plane allocation curve for a given code size.

The present inventor contemplates that one of the additional advantages of the present invention is that by using a zero-tree coder and a vector quantizer, each on an appropriate domain of the image data, re-quantization of the image to a new step size by the zero-tree is avoided. As is apparent, when an image is digitized it is in fact already quantized. Re-quantization of the image data is computation-intensive and inevitably adds quantization noise. At locations with smoothly varying data, changes in the direction of rounding of certain pairs of adjacent close-valued pixels (an inherent risk in re-quantization) maximize the visible re-quantization noise locally, resulting in a "bruise" or "dent" in the image. All prior art quantization schemes of which the present inventor is aware require re-quantization involving changing the quantization step size. Thus, these techniques either cause image damage (artifacts) at higher compression levels and/or require additional, computationally expensive, processing to reduce such introduced artifacts at the receiver.

Those pixels either vertically or horizontally (or diagonally) adjacent in the transform, having been quantized (rounded) in opposite directions, and having been identified as being part of a smooth region using a suitable two-dimensional analysis function, can carry smoothness tags in the transmitted vector quantizer data set. At the receiver, it is contemplated that these quantization-damaged smooth vectors can be re-smoothed to the local two-dimensional gradient by a suitable filter. This filter can be any filter capable of using the two-dimensional surround to re-smooth the two or more pixels suffering the excess quantization noise. A four-by-four or five-by-five pixel block centered on the two (or more) pixels to be smoothed can supply the surround for adequate smoothing.

In the case of multiple pixels rounding in opposite directions in a small group, the larger five by five sample area can be employed, and all tagged pixels can be removed from the smoothing sample supplied to the filter at the receiver. This technique can address the problem of receiver-based smoothing algorithms blindly smoothing edges, patterns and textures. It can also greatly reduce the processing burden at the receiver, since there will not be very many such smooth pixel pairs oppositely rounded by the quantizer. It is contemplated that this process will require little overhead in terms of transmitted smoothness data, since for a reasonably quantized image there would be few such dents in smooth regions and yet the improvement to the reconstructed image will be visually significant.

As the zero-tree coder codes mainly edges which are likely to be noisy or masked by luminance contrast, and since its data is sent to higher relative accuracy than the lower bit planes, one can ignore smoothness issues in this quantizer. However, since the zero-tree coder represents a small data set and since it is not constrained to a small codebook of vectors, quantization dents on smooth data pixels can be addressed directly by transmitting the identified smooth pixels to sufficient numbers of bits regardless of the bit plane division point used by the quantizers.

Lossless coding stage 40 can comprise any suitable coding technique, as will occur to those of skill in the art. For example, Huffman, Arithmetic, or Lempel, Ziv (LZ, LZ77, LZW, etc.) coding may be employed. For further entropy reduction, the neural vector prediction coder technique of Fioravanti et al. described in, "An Efficient Neural Prediction for Vector Quantization", ICAASP-94, April 1994, Vol. 5, I, pp V613–V616, R. Fioravanti, S. Fioravanti, D. Giusto, can be employed on the vectors.

The selection of the specific lossless coding technique to be used will depend, to some extent, on a trade-off between higher compression ratios and the computational complexity of the compression technique (i.e.—the speed with which the data may be coded on a given processor). For video image systems, faster but generally less efficient coding techniques such as LZW or LZ77 may be preferred, such as those described in, "Data and Image Compression Tools and Techniques, Fourth Edition", 1996, Ch. 6, pp 265–310, Gilbert Held, while for still images Arithmetic coding may be preferred. However, as will be apparent to those of skill in the art, if the present invention is embodied in dedicated hardware, concerns such as the speed of the lossless coding scheme can be mitigated.

For video compression, wherein the images are of low to medium quality only, additional performance can be obtained by sub-sampling the color space prior to quantization. Specifically, it has been found that the bottom level (the highest resolution Wavelet hierarchy) of the color subbands can be disposed of. The receiver (decompressor) merely assumes the mean values of the horizontal, vertical and diagonal blocks of the convolution pyramid for the missing bottom level and this is equivalent to 4:1:1 sub-sampling in video recording applications, where the color information resolution is half in each direction of the monochrome information.

The zero-tree coder can, however, reach the lowest hierarchy, thus giving good high-resolution color registration for higher amplitude color data, while benefiting from the lower entropy of sub-sampled color. Typically, the color transform planes can be compressed much more than the luminance plane for a given visual quality level. This means that the color planes may not require any vector quantizer in the lowest blocks (or even at all) and purely be handled by the zero-tree coder.

If 4:1:1 sub-sampling is used and the zero-tree doesn't reach the bottom level in the color transforms, the present inventor contemplates that visual quality can be regained at the receiver by "bleeding" areas of color pixels to re-register with luminance edges in the transform.

In the case of full motion video, inter-frame compression techniques such-as motion prediction, and coding only those blocks which change from frame to frame, using several delta frames between key frames can also be employed to further reduce bandwidth requirements, as will be apparent to those skilled in the art.

To reconstruct images, the actual individual frame reconstruction for both motion and still image compression schemes will be handled as described below.

For each color plane, the DC block is inverse entropy coded, if necessary, and inverse delta coded and the zero-tree data is inverse entropy coded with the appropriate decoder to yield a differentially coded data-root address stream, a dominant pass data-tree symbol stream, and a subordinate pass amplitude data stream. This is followed by the extraction of the sign bits and of the locations in the transform space coordinates, of the pixels recorded in the zero-tree, starting in the hierarchies closest to the DC term, from highest hierarchy to lowest, followed by their absolute values to the accuracy specified for the zero-tree coder and these are combined with the sign bits to give a signed magnitude value.

When the data trees and addresses have been reconstructed, the data corresponding to each address implied, included as a delta address, or sent in full, in the zero-tree data stream is then scanned into the memory space allocated for the transform. First, the signed magnitude of the data root is stored in its location, then, using the symbol data to fill in zero-trees, signs and embedded zero values, the Morton scan pattern is used to fill in vacant pixels in the tree, going from higher to lower hierarchies. Subordinate data for the significant data locations are loaded in the Morton scan pattern down the tree, avoiding zero-trees and embedded zero values, either bit plane by bit plane, if that is how they were stored, or as complete absolute magnitudes to be combined with the signs placed earlier.

The vector data is inverse entropy coded (using the inverse of whichever entropy coder was employed to losslessly compress the vector data) and the vector data, which is a set of pointers to a codebook, is then read and the bottom bits of the transform are populated in groups of pixels, by fetching the codebook entries for each pointer. When this is completed, the transform is ready to undergo any filtering to smooth dents and bruises during the inverse of the wavelet transform operation.

If a pair, or more, of pixels has been tagged with smoothing flags, then the smoothing can either be performed in transform space, using smoothing filters on the transform directly, or the level can be inverse waveleted by one level and the smoothing applied in image space at the corresponding (now scaled by 2) location. If the picture was non-monochrome (color), the next step involves the Y-Cr-Cb to RGB color transform yielding Compressed Data Output 44 which is a reasonable reconstruction of the original image given the degree of compression applied.

Not included in the discussion above is error detection and control which, for transmission of compressed data output 44 over noisy channels, may be necessary. Any suitable techniques and/or methods of implementing such error detection and control can be employed with the present invention, as will be apparent to those of skill in the art and need not be further discussed herein.

As mentioned above, in environments wherein lossless compression is desired and therefore additional compression cannot be gained from quantization techniques, the present invention can be operated as follows. In signal processing stage 32, a second wavelet processing pass is performed in each direction, in each of three orientations of the largest one or two AC levels in the pyramid to yield a greater reduction in entropy for most images by filtering texture into smaller subblocks of the transform, leaving larger numbers of zero-valued pixels in flat areas. This will collect low/low frequency information into the upper-left quadrant of the subband and high/high frequency information into the lower-right quadrant of the subband.

Figure 8:
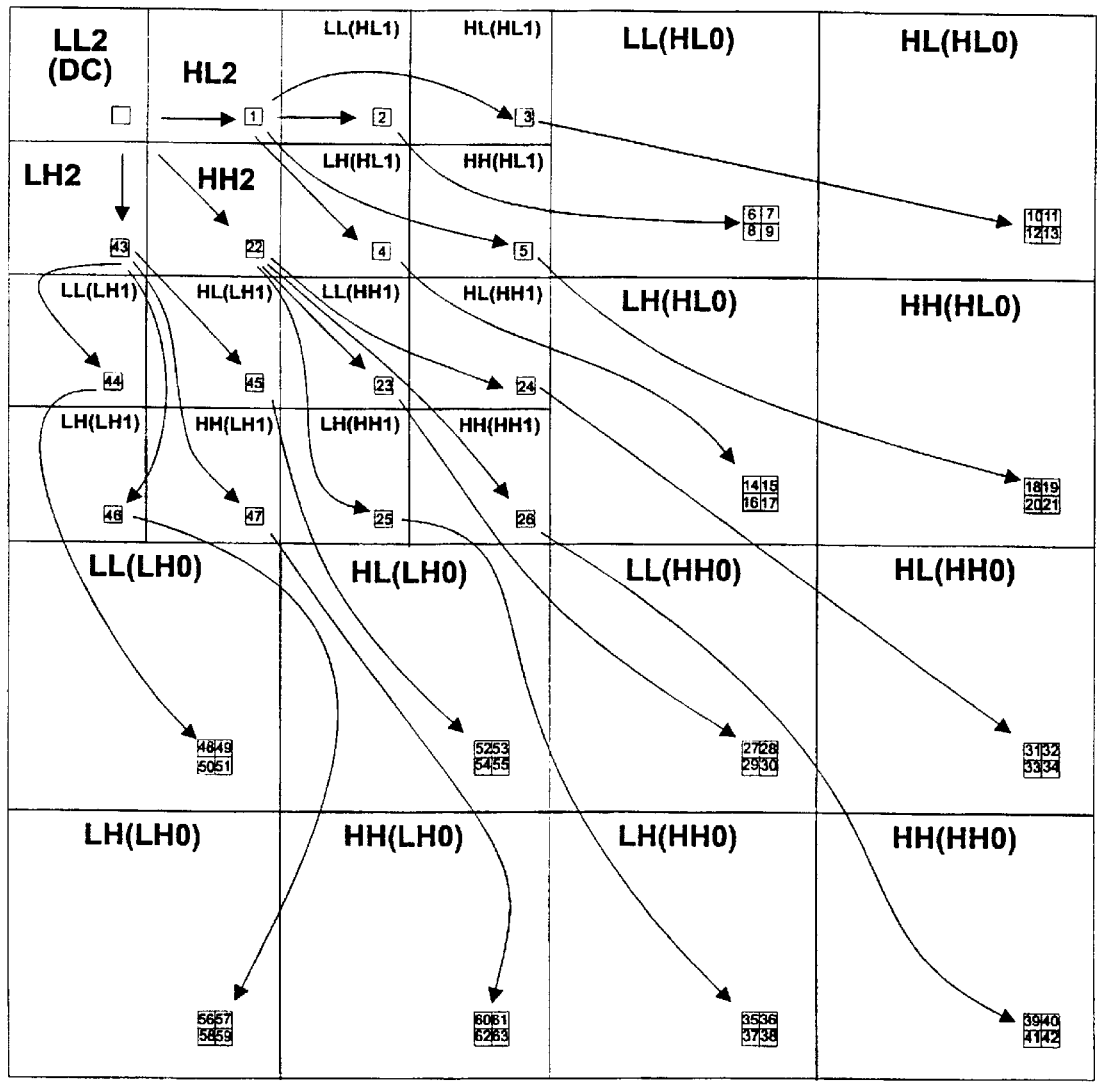
FIG. 8 illustrates the spatial relationships in horizontal, diagonal and vertical orientations between pixels forming a data-tree in a three-level pyramid on which a second wavelet pass has been performed in each axis on each orientation of the lowest two hierarchies.
Figure 9:
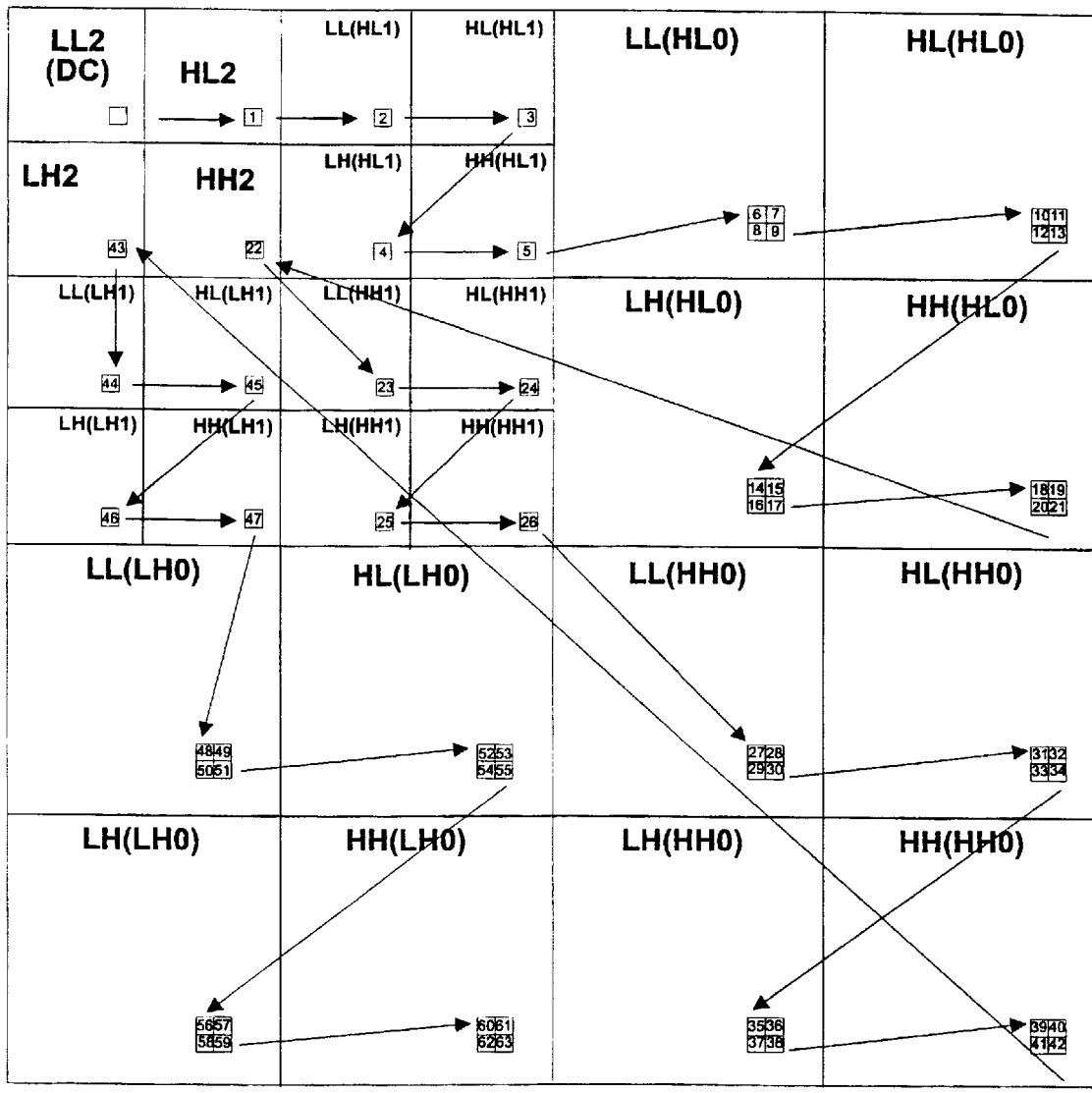
FIG. 9 shows the Morton scan pattern and sequence for the transform in FIG. 8.

It is contemplated that this will be very useful in lossless compression applications where additional compression cannot be gained by quantization techniques. The cost in processing time of additional wavelet passes may not be critical compared to the additional storage or bandwidth gained in critical applications such as medical imaging. The second wavelet pass would necessitate modification to the spatial location relationships of the zero-tree method as indicated in FIGS. 8 and 9. In these Figures, which show the spatial relationships for the double pass wavelet on the lowest two hierarchies, one pass per orientation, the numbers in the boxes representing the pixels indicate the tree structure ordering information.

The data trees would be formed much the same as for the pyramid described above with reference to FIGS. 6 and 7 with all parent pixels coming before children in the next hierarchy, child pixels in a subband being scanned in a left-to-right, top-to-bottom order for any orientation, with quads or super-quads of children being scanned in the Morton pattern.

Since a subband has already been swept in both directions, the data in the three new AC sub-subbands will be spatially very sparse, thus the image will be further de-correlated. It is important to note that with additional passes of the wavelet, more significant bits must be kept to ensure perfect reconstruction. Specifically, as will be apparent to those of skill in the art, serious errors can result in the image if strict error limits by subband are not adhered to. As will be apparent, the cost in processing time of additional wavelet passes may not be significant compared to the additional storage or bandwidth gained in many applications, such as medical imaging.

If a 2×2 pixel vector quantizer is used to encode the low-amplitude data under the lower zero-tree threshold, then the most efficient manner of transmitting or keeping only required data, would be to send only non-trivial vectors (i.e.—non-zero), and this requires a vector quantizer with addressing. Since there is already a mechanism for storing addresses virtually within the zero-tree coder, by expanding the symbol set a little symbols to code for a 2×2 vector belonging to a tree node can be embedded in the vector data stream (possibly with regular zero-tree children embedded within the vector). If the vector quantizer is a lattice it can be codebook-free, and extremely fast. If the vector quantizer process is a nearest neighbor algorithm, it will merge nodes better than a regular lattice, but more slowly, and requiring the storing and transmission of a codebook.

The present inventor proposes a hybrid vector quantizer (if hardware becomes available or speeds increase) which would first use a nearest neighbor to ideally reduce the cluster count with minimal error produced (difficult for lattice vector quantizer), and then register the remaining clusters to an appropriate lattice without merging any data. This would permit codebook free vector quantizer operation without the inherent quality drawbacks of lattice vector quantization.

The above-described embodiments of the invention are intended to be examples of the present invention and alterations and modifications may be effected thereto, by those of skill in the art, without departing from the scope of the invention which is defined solely by the claims appended hereto.

APPENDIX A

Matrix Notation for Daubechies-4 Wavelet Operating on Image

| | | | | | W | | | | | | | | I |
|---|---|---|---|---|---|---|---|---|---|---|---|---|---|
| L1 | L2 | L3 | L4 | 0 | 0 | 0 | . | . | . | 0 | 0 | 0 | 0 I(U,1) |
| 0 | 0 | L1 | L2 | L3 | L4 | 0 | 0 | 0 | . | . | . | | 0 I(U,2) |
| 0 | 0 | 0 | 0 | L1 | L2 | L3 | L4 | 0 | . | . | . | | 0 I(U,3) |
| . | . | . | | | | | . | | | . | . | | . . |
| . | | | | | | | | | | | . | | . |
| . | | | | | | | | | | . | | | . |
| 0 | 0 | 0 | 0 | 0 | . | . | . | | | L1 | L2 | L3 | L4 I(U,N/2 − 1) |
| L3 | L4 | 0 | 0 | 0 | . | . | . | | | | 0 | L1 | L2 I(U,N/2) |
| H1 | H2 | H3 | H4 | 0 | 0 | 0 | . | . | . | 0 | 0 | 0 | 0 I(U,N/2 + 1) |

APPENDIX A-continued

Matrix Notation for Daubechies-4 Wavelet Operating on Image

| W | | | | | | | | | | | | I | |
|---|---|---|---|---|---|---|---|---|---|---|---|---|---|
| 0 | 0 | H1 | H2 | H3 | H4 | 0 | 0 | 0 | . | . | . | 0 | I(U,N/2 + 2) |
| 0 | 0 | 0 | 0 | H1 | H2 | H3 | H4 | 0 | . | . | . | 0 | I(U,N/2 + 3) |
| . | . | . | | | | | | | | . | | . | . |
| . | | | | | | | | | | . | | . | . |
| . | | | | | | | | | | . | | . | . |
| 0 | 0 | 0 | 0 | 0 | . | . | . | H1 | H2 | H3 | H4 | 0 | I(U,N − 2) |
| 0 | 0 | 0 | 0 | 0 | . | . | . | | H1 | H2 | H3 | H4 | I(U,N − 1) |
| H3 | H4 | 0 | 0 | 0 | . | . | . | | | 0 | H1 | H2 | I(U,N) |

APPENDIX B

```
Modified Zero-tree coder:
Sub ZeroTreecoder ()
    for each coior piane of the wavelet transform (Y only, or Y then Cr then Cb)
        load wavelet transform data
        find bit plane of largest amplitude (+ or -) data
        let this plane be caiied TopBit
        let lowest bit plane assigned to zero-tree be called BottomBit
        for bit plane# = TopBit To BottomBit Step - 1
            if bit plane# < TopBit then do "SubordinatePass"
            for currentlevel = #levels - 1 To 0 Step - 1
                for Y = top row of HorBlock to bottomrow of HorBlock
                    for X = leftpel of HorBlock row Y to rightpel of HorBlock row Y
                    Check pel amplitude at corresponding location in all 3 blocks in
            level
                    if at least 1 previousiy insignificant pel this plane
                then
                        "ProcessDataTrees"
                    end if
                    next X
                next Y
            next currentlevel
        next bit plane#
    next color
End Sub
Detailed Method:
Sub SubordinatePass ()
    let amplitude = 2 ^ bit plane#
    for signif_datum# = 1 to current_datum#
        let abspel = abs(xform_pixel_value(color,
            X(signif_datum#),Y(signif_datum#))
        let pelbit = (abspel AND amplitude) / amplitude
            place pelbit in subordinate data stream
    next signif_datum#
    End Sub
Simplified Method:
Sub SubordinatePass ()
    let mask = 0
    for bit# = ZTree_botton_plane# to bit plane# '(where the 1's bit plane# =
0)
        let mask = mask + 2 ^ bit#
    next bit#
    for signif_datum# = first datum# in previous bit plane scanned t0
        current_datum#
        let abspel = abs(xformpixel_value(color,
            X(signif_datum#),Y(signif_datum#))
        let peldata = abspel AND mask
        place peldata in subordinate data stream
            '(or group pel data & vector quantize)
    next signif_datum#
End Sub
Data Tree Processor:
Sub ProcessDataTrees
    for orient = 0 to 2 '(horizontal then diagonal then vertical)
        set correct pixel address for given orientation
        "AssignTreeSymbols" '(go down levels, assign +, -, 0 symbols)
        "AssignTreeRotts&Nulls"   '(apply the rules
            to assign 0root &Prune-Branch symbols)
        "PutTreeslnDatastream" '(place tree symbols into
            dominant pass data stream)
    next orient
End Sub
```

I claim:

1. A method of compressing a digital image to obtain a compressed image data set for subsequent reconstruction, comprising the steps of:
   (i) determining if the digital image is a color image in RGB color space and converting any determined RGB color images to a less redundant color space;
   (ii) performing a wavelet decomposition upon each of the color planes of the image in said less redundant color space to obtain a transform of DC and non-DC terms;
   (iii) lossless coding the DC terms;
   (iv) converting the transform to sign and magnitude format and selecting a division point comprising one of an adjacent pair of bit-planes and a pair of adjacent amplitudes, which separate the non-DC terms into first and second ranges based upon absolute magnitudes, the first range comprising the values of the transform which are greater in magnitude than those values in the second range of the transform;
   (v) employing a scalar quantizer to encode the values in the first range;
   (vi) employing a vector quantizer to encode the values in the second range; and
   (vii) coding the resulting data set with a lossless entropy encoder to obtain a compressed image data set.

2. The method according to claim 1 wherein said division point is selected by iteratively applying said scalar quantizer and said vector quantizer to ranges defined by at least two pairs of adjacent bit-planes or pair of adjacent amplitudes and comparing each of the results of said applications and selecting the division point wherein the results are closest to a predefined criteria.

3. The method according to claim 1 wherein said division point is selected by assuming that the histogram is the result of two curves, one a large spike and the second a shallow gaussian, and placing the thresholds symmetrically about the center of the histogram outside the crossovers of the two curves.

4. The method according to claim 2 wherein said predefined criteria is expressed in terms of an image quality metric.

5. The method according to claim 4 wherein said image quality metric is a mean square error metric.

6. The method according to claim 4 wherein said image quality metric is the $L_1$ norm metric.

7. The method according to claim 4 wherein said image quality metric is a peak signal to noise ratio metric.

8. The method according to claim 2 wherein said predefined criteria are expressed in terms of the size of the compressed image data for a selected image quality.

9. The method according to claim 1 wherein said scalar quantizer is a zero-tree type coder.

10. The method according to claim 1 wherein said vector quantizer is a lattice-type coder.

11. The method according to claim 1 wherein said vector quantizer is an Equitz PNN-type coder.

12. The method according to claim 1 wherein said conversion of a determined RGB image to a less redundant color space includes the step of determining color space statistics for said determined RGB image including the mean, maximum, and minimum in each orthogonal plane of the color space to allow the reconstruction of said determined RGB image to be calibrated.

13. The method according to claim 2 wherein, before selecting said division point, data is depleted from said transform by removing or more severely quantizing data representing image elements which are otherwise imperceptible by the human visual system due to masking by other information in the image according to one or more predetermined visual sensitivity rules.

14. The method according to claim 1 wherein said wavelet decomposition is performed iteratively on subbands of said image to further reduce image correlation.

15. The method according to claim 1 wherein step (ii) further comprises the step of framing the image data with a data border of preselected width, the values of data in said border selected such that the values decrease smoothly and continuously from the gradient at the edges of the image to a value representing a flat 50% gray at each edge of the frame.

16. The method according to claim 1 wherein step (iii) the DC terms are arranged in a rectilinear array and the lossless coding is delta coding which is performed on a row by row basis of said array, with the first data element in each row being unencoded as a reference and, when coding of said rows is completed, delta coding the first column of said array with the first pixel in said column being unencoded as a reference.

17. The method according to claim 1 step (vi) wherein the selection of components of the vectors is made in such a way that triads of pixels are grouped so that a vector represents three pixels in the transform, each pixel representing the same spatial location in each of three orientation blocks of a single level (and thus scale) of the image transform pyramid, thereby decorrelating the redundancy of the pyramid's three orientation analysis.

18. The method according to claim 1, where in step (vi) the selection of components of the vectors is performed such that 2×2 quads identical to child vectors are defined as vectors if they possess data below the threshold, where these quads appear identically in each of Y, Cr, and Cb spaces.

19. The method described in claim 1 step (vi) wherein the selection of chrominance vector components is based on Cr-Cb pairs at a given pixel location in transform space yielding two-dimensional vectors to reduce the redundancy in color and scale/spatial location of the transform.

20. The method described in claim 18 wherein the selection of chrominance vector components is based on Cr-Cb pairs from each of the horizontal, vertical and diagonal blocks of a selected scale of the transform at a given spatial location yielding six-dimensional vectors to reduce the redundancy in color and scale/spatial location of the transform.

21. The method described in claim 1 step (vi) wherein adjacent pixels to be handled by the vector quantizer, identified as representing smoothly varying data, and quantized such that they are rounded in opposite directions are tagged in the vector stream so that the receiver can locally optimally re-smooth such pixels appropriately, without the overhead of general smoothing filters at the receiver and thereby without the incurred quality loss of smoothing edges and textures to repair dents and bruises.

22. The method described in claim 1 step (v) wherein adjacent, smooth-data pixels near edges, to be handled by the zero-tree coder, which would otherwise suffer from opposite rounding are sent in the zero-tree data with sufficient accuracy to reconstruct smoothly.

23. The method described in claim 1 step (ii) wherein color subsampling is employed to gain additional compression and wherein such subsampling which would induce mis-registration of the color data on the luminance data is corrected at the receiver by bleeding colors back into registration with luminance edges after performing the inverse wavelet transform.

24. The method described in claim 9 wherein the subordinate pass is performed in such a way that permits vector coding of similar amplitude subordinate data, such that for all newly significant transform pixels in the previous bit plane dominant pass, the absolute value of the pixel (from the current bit plane to the lowest bit plane assigned to the zero-tree coder) is sent to the subordinate data stream at once for entropy coding or for grouping into vectors to be dealt with by a subsequent vector quantizer.

25. The method described in claim 9 wherein a single dominant pass encodes all zero trees and their root addresses whose data-roots are present in any bit plane assigned to the zero-tree coder and wherein a single subordinate pass encodes the magnitudes of the significant data to sufficient accuracy as determined by hierarchy, adjacent pixel rounding error, and compression considerations.

26. The method described in claim 25 wherein the data roots are pre-sorted in each hierarchy by average absolute magnitudes of triads to reduce entropy.

27. The method described in claim 1 wherein in step (iii) the lossless coding is delta coding.

28. The method described in claim 1 wherein step (ii) further comprises performing a second wavelet decomposition on at least the largest level of non-DC terms resulting from the first wavelet decomposition and step (iv) is performed on the resulting transform.

29. The method of claim 1 wherein said less redundant color space is Y-Cr-Cb color space.